United States Patent
Kato et al.

[11] Patent Number: 6,101,443
[45] Date of Patent: Aug. 8, 2000

[54] ROUTE SEARCH AND NAVIGATION APPARATUS AND STORAGE MEDIUM STORING COMPUTER PROGRAMS FOR NAVIGATION PROCESSING WITH TRAVEL DIFFICULTY BY-PASS

[75] Inventors: Shinichi Kato; Katsuhiko Mutsuga, both of Anjo, Japan

[73] Assignee: Aisin AW Co., Ltd., Japan

[21] Appl. No.: 09/056,786

[22] Filed: Apr. 8, 1998

[30] Foreign Application Priority Data

Apr. 8, 1997 [JP] Japan ..................................... 9-105236

[51] Int. Cl.[7] ........................... G01C 21/00; G08G 1/123
[52] U.S. Cl. ........................................... 701/210; 340/995
[58] Field of Search ..................................... 701/210, 209, 701/211, 208; 340/995, 905; 342/451

[56] References Cited

U.S. PATENT DOCUMENTS 5,406,490  4/1995  Braegas .................................... 701/210
5,612,882  3/1997  LeFebvre et al. ....................... 340/995
5,892,463  4/1999  Hikita et al. ............................. 340/995
5,904,728  5/1999  Tamai et al. ............................. 701/211

*Primary Examiner*—Gregory C. Issing
*Attorney, Agent, or Firm*—Lorusso & Loud

[57] ABSTRACT

The present invention prevents execution of a detour route search, responsive to and in accordance with received VICS data, where certain conditions are not met. To this end, the system of the invention calculates a time RT1 required for a vehicle to move from its present location to a first point where the vehicle must turn to the right or left to follow a previously determined guidance route and also calculates a time CT required to conduct a route re-search based on the received VICS data. If RT1≦CT the system then performs a route re-search based on the received VICS data. On the other hand, if RT1<CT execution of the route re-search is prohibited.

14 Claims, 14 Drawing Sheets

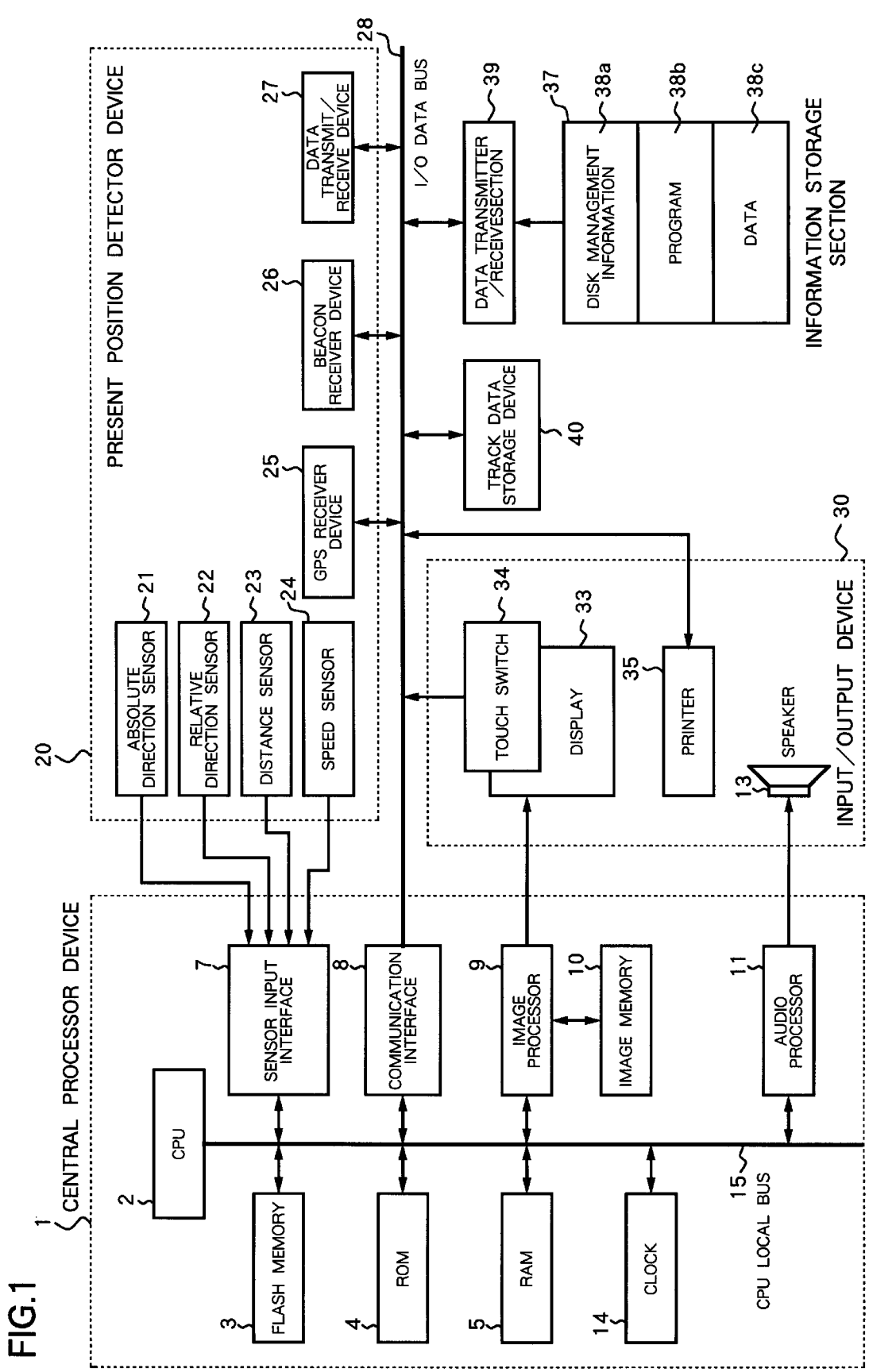

FIG.2

| | |
|---|---|
| MAP DATA FILE | F1 |
| INTERSECTION DATA FILE | F2 |
| NODE DATA FILE | F3 |
| ROAD DATA FILE | F4 |
| PHOTOGRAPH DATA FILE | F5 |
| DESTINATION DATA FILE | F6 |
| GUIDANCE DATA FILE | F7 |
| DETAILED DESTINATION DATA FILE | F8 |
| ROAD NAME DATA FILE | F9 |
| BRANCH-POINT NAME DATA FILE | F10 |
| ADDRESS DATA FILE | F11 |
| LOCAL/AREA PHONE NUMBER LIST DATA FILE | F12 |
| REGISTERED PHONE NUMBER DATA FILE | F13 |
| MARK DATA FILE | F14 |
| POINT DATA FILE | F15 |
| FACILITY DATA FILE | F16 |
| LINK DATA FILE | F17 |

LINK DATA FILE F17

| VICS LINK NUMBER VRB (n) | |
|---|---|
| VRB (1) | ROAD NUMBER DR101 OF CD |
| | ROAD NUMBER DR102 OF CD |
| | ROAD NUMBER DR103 OF CD |
| | ROAD NUMBER DR104 OF CD |
| | |
| ⋮ | ⋮ |
| VRB (n) | ROAD NUMBER DR601 OF CD |
| | ROAD NUMBER DR602 OF CD |
| | ROAD NUMBER DR603 OF CD |
| | |
| | |

ROUTE SEARCH AND NAVIGATION APPARATUS AND STORAGE MEDIUM STORING COMPUTER PROGRAMS FOR NAVIGATION PROCESSING WITH TRAVEL DIFFICULTY BY-PASS

BACKGROUND OF THE INVENTION

1. Field of the Invention

The present invention relates to navigation apparatus for searching for travel routes for a land vehicle, based on map information, and for transmitting information regarding the route(s) located by search to the driver of the vehicle. More particularly, the invention relates to route search apparatus with an improved scheme for searching for an optimum route leading to a destination, and to its associated navigation apparatus, as well as to a medium storing therein computer programs for execution of the improved search scheme.

2. Description of the Prior Art

Systems have recently been proposed for transmitting traffic information concerning roads, parking areas and the like between road information stations, such as for example, a vehicle information communications system (VICS) or automobile traffic information system (ATIS), and navigation apparatus built into land vehicles. More specifically, information as to roads and parking areas may be collected and organized at information acquisition/collection centers, including the Metropolitan Police Office, National Road Traffic Information Center, Parking Area Management Center, and the like. The collected information as to roads and the like is transmitted over the air from the VICS center by means of either radiation broadcasting—such as optical beacons, radio-wave beacons, FM multiplexing (frequency modulation multiplex scheme), or wireless telephones.

Transmitters for transmitting an optical beacon or radio-wave beacon are installed at constant intervals along respective roads, either above each road or on the ground surface. When a land vehicle having a built-in receiver (light-receiving device or the like) for an optical beacon or radio beacon passes under or immediately above one of such transmitters, it receives VICS data. Also, in the case of FM multiplex radiation, VICS data may be received by commercially available radio modules capable of receiving FM broadcast programs. Further, in the case of wireless telephones, VICS data may be available through use of general-purpose public telephone sets such as handheld telephones.

The VICS data as transmitted by light or radio beacons may include information about road segments in a relatively narrow area of coverage near or around the beacon transmitter. Alternatively, the VICS data transmitted by either FM multiplex or wireless telephone may include information about roads in a relatively wide area.

In ATIS, information collected by the information acquisition agency, such as the Japanese Road Traffic Information Center, is transmitted via public telephone communication networks. In other words, unlike VICS, in ATIS, necessary road information is down-loaded by means of interactive communication. It is thus possible to receive items of information about roads or streets limited to a desired local area.

A navigation apparatus receiving road information in the form of VICS data, selectively changes a guidance route in accordance with the content of such road information. For example, when it is determined from the received road information that a street or road which is crowded or under construction is included within a previously set guidance route, the navigation apparatus conducts a new search to determine a new guidance route which detours the problem road. In other words, the guidance route may be changed or modified at any time when such a need is indicated by the up-to-date road information, thus enabling more comfortable travel toward either a destination or a temporary stopover location. Note here that the first searched guidance route is that determined by the initial search, i.e. at a point in time when a destination is set in the navigation apparatus or, alternatively, at the time when a stopover location is set therein. Where no roads or streets with traffic difficulties, such as traffic congestion, are detected during travel along a guidance route, travel guidance is performed in the usual manner along that guidance route.

However, it can happen in some cases that execution of such a guidance route change, in accordance with road information received from the road information station, such as VICS or the like, results in inconvenience or error. By way of example, where a land vehicle is traveling near or around a road-crossing point or "intersection" at which the vehicle should turn to the right or left to follow the prior searched guidance route, it might occur that a re-search is started to search for a guidance route in conformity with newly received road information. In this case, since a certain time is required for execution of such a re-search, during that time guidance routes may vanish from the display screen, while presentation of audible information is simultaneously interrupted. Further, if a guidance route change is made suddenly at a location near and in advance of the intersection at which the vehicle is to change its travel direction, such change might require a rapid change of vehicle operation, such as a lane change or the like, which change in vehicle operation might be difficult and even dangerous.

SUMMARY OF THE INVENTION

To avoid the foregoing problems, the present invention provides for selection of whether or not a search for a detour route is to be initiated in a specific case where a road with a traffic problem is determined, from received VICS data, to exist within a guidance route leading to a previously set destination. More specifically, a new route search is executed only where there is sufficient time to complete a series of processings associated with the route re-search before the vehicle will arrive at a point, along the currently set guidance route, where an action for change in the direction of travel is required.

Accordingly, the vehicle navigation apparatus of the present invention includes present position detection means for detecting the present location of the apparatus, as exemplified by the absolute direction sensor 21, relative direction sensor 22, distance sensor 23 or GPS receiver device 25 shown in FIG. 1. The apparatus further includes a road traffic information receiver, as exemplified by beacon receiver device 26 or data transceiver device 27, for receiving road traffic information; route search means (step SA4 of FIG. 7) for searching for a route leading to a destination; necessary time calculation means (or "search estimation means") (step SB14 of FIG. 8) for determining, e.g. by calculation, the time required for a route re-search (step SA5 of FIG. 7) in conformity with the road traffic information received by the transceiver device and for initiating guidance based on a new route determined by the re-search; and prediction means (step SB8 of FIG. 8) for determining, e.g. by calculation, a predicted time of travel for the vehicle to arrive at a specified location in advance of a selected road branch or intersection; comparison means (step SB16 of FIG. 8) for comparing the necessary time with the predicted time; and judgment means (step SB16 of FIG. 8) responsive to the comparison for judging whether or not a route re-search is to be conducted.

Alternatively, the navigation apparatus of this invention includes the aforementioned present position detection means, road traffic information receiver, and route search means and further includes guidance starting time-point storage means (step SB20 of FIG. 8) for storing a guidance starting time-point for start of guidance along a new guidance route determined by a route re-search conducted in accordance with the road traffic information that has been received by the road traffic information receiver; issuance time-point storage means (time stamp TSP1 of FIG. 3) for storing therein an issuance time-point for newly received road information; comparison means (step SB6 of FIG. 8) for comparing the stored guidance start time-point with the issuance time-point; and judgment means (step SB6 of FIG. 8) responsive to the comparison for judging whether a route re-search is to be conducted.

In another embodiment the navigation apparatus of the present invention includes the aforementioned present position detection means, road traffic information receiver, route search means, necessary time calculation means, prediction means for predicting time the vehicle will require to reach a travel direction change location at which it is expected to turn to follow the route thus route-searched, in accordance with the received road traffic information, comparison means (step SB16 of FIG. 8) for comparing the search time calculated by the necessary time calculation means, with the predicted time, and judgment means (step SB16 of FIG. 8) for judging, based on that comparison, whether or not a route re-search is to be conducted.

These and other objects, features and advantages of the invention will become apparent from a reading of the following description of preferred embodiments of the invention, as illustrated in the accompanying drawings.

The terminology "new guidance route", as used herein, has reference to a guidance route determined en route, subsequent to determination of an initial guidance route responsive to input of a starting point, destination and/or stop-over point, etc. The "new guidance route", unlike the initially set guidance route, is determined responsive to road traffic information received by communication from a remote location such as a VICS transmitter. The "new guidance route" can be a route entirely different from the initially set guidance route or may incorporate portions thereof. For example, the "new guidance route" may be the initially set guidance route modified by addition of a detour around an impedence to travel identified in information received from the remote location.

BRIEF DESCRIPTION OF THE DRAWINGS

FIG. 1 is a block diagram of the overall configuration of a navigation apparatus in accordance with the present invention.

FIG. 2 illustrates the structure of data 38c stored in information storage device 37.

FIG. 5 is a diagram illustrating structure of a link data file F17.

DESCRIPTION OF THE PREFERRED EMBODIMENTS

Overall Structure

Figure 1A:
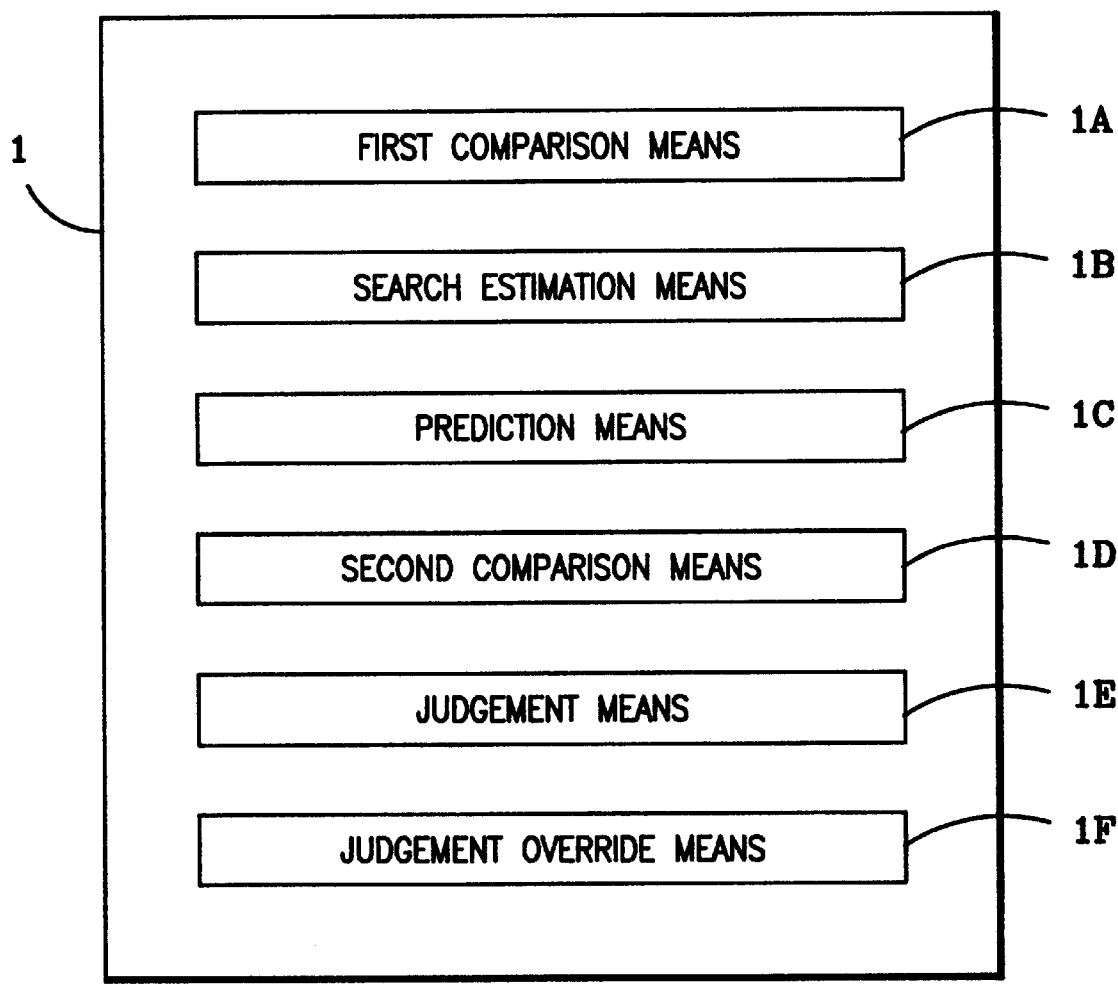
FIG. 1A is a block diagram of the computer of the apparatus of FIG. 1 programmed in accordance with one embodiment of the present invention.

FIG. 1 shows the overall configuration of an embodiment of a navigation apparatus in accordance with the present invention. A central processor 1 controls operations of the entire navigation apparatus and includes a central processing unit (CPU) 2, flash memory 3, read-only memory (ROM) 4, random access memory (RAM) 5, sensor input interface 7, communication interface 8, image processor 9, image memory 10, audio processor 11, and clock generator 14. The various elements of the central processor 1 are interconnected by a CPU local bus 15. Under control of the CPU 2, various types of information data may be transmitted and received the among respective elements such as the flash memory 3 and the like.

FIG. 1A schematically represents the computer 1 in the apparatus of FIG. 1, programmed in accordance with one embodiment of the present invention. As shown in FIG. 1A, the programmed computer includes first comparison means 1A for comparing the information received from the remote location, which may include information identifying the location of an impedence to travel, with a present guidance route ("new guidance route" or "initially set guidance route") to determine if the impedence to travel is located ahead on the present guidance route. The search estimation means 1B responds to a determination that the impedence to travel is located ahead on the guidance route by determining a necessary time or necessary distance required for a new route search to determine a new guidance route by-passing the impedence to travel and for preparation to initiate guidance along the new guidance route. The prediction means 1C determines a predicted travel time or predicted travel distance between a detected present location and a specified location in advance of the location of the impedence to travel. For example, the specified location may be a branch in the road where a vehicle equipped with the apparatus of the present invention would turn to start travel on a new guidance route or, in the alternative, may be a point in advance of such a branch in the road to allow for time for the driver to prepare to make such a turn in accordance with the new guidance route. The second comparison means 1D compares the necessary time with the predicted time or the necessary distance with the predicted travel distance. The judgement means 1E makes a decision, based on the comparison of the second comparison means, as to whether or not the new route search is to be conducted. The judgement override means 1F determines whether or not the received traffic information identifies a traffic impasse on the present guidance route, in advance of a detected present location, and commands the new route reach, overriding any contrary determination by the judgement means 1E, responsive to identification of a traffic impasse.

The flash memory 3 is an electrically erasable and writable read-only memory (EEPROM) or its equivalent. Written and stored (installed/transferred) in this flash memory 3 (internal storage medium/means) is a computer program 38*b* as recorded in an information storage device 37 (external storage medium/means) such as an optical disc or magneto-optical disk. Additionally, the flash memory 3 is capable of storing therein a program 38*b* as transferred thereto from an external device, such as a main information processing device or the like, via a data transceiver 27.

Thus, the flash memory 3 is designed to store the externally prestored program(s) which are transferred thereto. Accordingly, upon changing the program stored in the flash memory 3, navigational guidance is executable by a new routine. Such a program is exemplified by program 38*b* which follows one of the flow charts to be described later, and may be any of a variety of programs executable by the CPU 2. For example, program 38*b* may provide display control of information and audible guidance control.

This reading/installation of a new program into flash memory 3 is automatically performed when an external information storage device 37, e.g. disk, is placed into the navigation apparatus, or when the subject navigation apparatus is activated by turning on its power. Alternatively, the new program may be installed responsive to some manual operation by the vehicle operator. Additionally, the external information storage device/medium 37 contains disk management information 38*a*, i.e. labels, file identifiers or the like, permitting identification of updated versions of the programs on the information storage device 37. Of course, this information storage device/medium 37 is interchangeable with other like information storage devices/mediums 37. It is thus possible to judge, based on the content of the disk management information 38*a*, whether or not a new information storage device 37 has been installed.

By way of example, since the flash memory 3 stores therein a program and associative management information for this program, the management information stored in flash memory 3 is compared with the disk management information 38*a* of external storage device 37 every time a new information storage device 37 is installed. Where it is judged that an external information storage device 37 containing a new program has been installed, the new program is read into flash memory 3. In this manner the system ensures that flash memory 3 always contains the most current version of the program and the data associated therewith. Thus, by changing the information storage device 37 the navigation apparatus may be provided with updated functions.

The information stored in the flash memory 3 also contains several kinds of parameters for use in navigation operations. The ROM 4 stores therein displayable graphics data and various kinds of general-purpose data. The displayable graphics data may be those data items required for displaying route guidance and map images on display screen 33. The various data items also include data used for navigation, such as audio waveform data which records electronic synthesized or actual human voice for voice guidance.

The RAM 5 stores externally input data, various formulas used for calculations, calculation results, and one or more navigation programs. In other words, RAM 5 may be used also as a cache memory, working memory and the like.

The clock generator 14 includes a counter, a battery backup RAM or EEPROM, and the like. This clock generator 14 outputs time information.

The sensor input interface 7 is an analog-to-digital (A/D) converter circuit, buffer circuit or the like. Connected to this sensor input interface 7 are the various sensors of present position detector 20. Sensor data, in the form of an analog signal or digital signal, is input to the sensor input interface 7 from the sensors of the present position detector 20. This present position detector 20 may include an absolute direction sensor 21, relative direction sensor 22, distance sensor 23, vehicle speed sensor 24, and the like.

The absolute direction sensor 21 may be, for example, a geomagnetic sensor for detecting the earth magnetism. This absolute direction sensor 21 outputs data indicative of the South and North directions which may serve as the absolute directions. The relative direction sensor 22 may be, for example, a steering angle sensor that makes use of a gyro device such as an optical fiber gyro, piezoelectric vibration gyro, or the like. This steering angle sensor detects the steering angle of a vehicle wheel. Relative direction sensor 22 outputs a relative angle for the direction of travel of a vehicle with the navigation apparatus built therein, relative to the absolute direction detected by absolute direction sensor 21.

The distance sensor 23 includes a counter or the like that is operatively associated with a travel distance meter. This distance sensor 23 outputs data representative of the travel direction of the vehicle. Distance sensor 23 is formed of a counter connected to a speed meter 24, or the like. This speed meter 24 outputs data proportional to the traveling speed of the vehicle.

An I/O data bus 28 is interconnected to a communication interface 8 of the central processor section 1. Connected in turn to this I/O data bus 28 are a GPS receiver 25, beacon receiver 26, data transceiver 27 and the like, all included as elements of the present position detector 20. Further connected to this I/O data bus 28 are a touch switch 34, printer 35 included in an input/output device 30, and data transmit/receive section 39 for reading data from the information storage device 37. In summary, communication interface 8 permits transmission and reception of various kinds of data items between the various system components and the CPU local bus 15.

The present position detector 20 operates to output data for use in detecting the present position or location of the vehicle as mentioned previously. The absolute direction is detected by the absolute direction sensor 21. Relative direction sensor 22 detects a relative azimuth angle with respect to this absolute direction. Further, a travel distance is detected at distance sensor 23. Travel speed of the vehicle is detected by speed sensor 24. The GPS receiver device 25 receives signals (microwaves from a plurality of satellites, each orbiting the Earth) from the global positioning system (GPS) for detection of geographic position data such as the latitude and longitude of the vehicle.

The beacon receiver 26 receives beacon waves as transmitted by a road information station, such as the vehicle information communications system (VICS) or the like and outputs to the I/O data bus 28 either information (VICS data) as to nearby roads or data for correction of GPS signals. Additionally, while the beacon may be a radio-wave beacon, light beacon or the like, the beacon signal as used in VICS is received only within a relatively limited area. Accordingly, VICS data reception is effectuated only when the vehicle with the navigation apparatus of this invention mounted therein passes through a location near one of information transmitters (transmission antenna, etc.) that send forth such beacon signals.

It should be noted that the information transmitters of a VICS system are installed, with constant intervals defined therebetween, at locations near road features such as road-crossing points or "intersections" along major roads and may be located either above the road or approximately level with the road surface. The VICS data transmitted as beacon signals from respective information transmitters may include data indicative of the traffic conditions for each nearby road, e.g. within an area of a 10 km radius with the information transmitter as its center. This data indicative of traffic conditions may also include general information items including, but not limited to, the degree of traffic congestion or traffic jam, impassability of an identified road section and amount of traffic, as well as traffic regulation information such as impassability due to construction work for road maintenance. Any road with such traffic regulation information related thereto is unsuitable for travel. Each information transmitter is under control of the road information station, such as VICS.

As the data transceiver 27, an FM multiplex radio-wave receiver, cellular phone, telephone communication link, or the like, may be used. In an ATIS (automobile traffic information service) bidirectional or interactive communications are provided via telephone links or the like. Where information is received by the FM multiplex radiowave receiver from the VICS center, only reception is available. In the case of interactive communications with the ATIS or VICS center via telephone networks, it is possible to select a local area for acquisition of road traffic information or information concerning parking facilities and the like. For instance, it is possible to receive certain information limited to only road conditions near the destination, or alternatively, traffic information as to traffic congestion on respective roads in an expanded area extending from the starting location to the destination. Such information may be used as auxiliary travel information. Either one or both of the beacon receiver 26 and data transceiver 27, may be incorporated into the navigation apparatus, depending upon practical considerations. The data transceiver 27 may alternatively be a wireless communication device such as a commercially available radio receiver, television receiver, handheld telephone, or pager.

The input/output device 30 includes a display screen 33, touch switch 34, printer 35, and speaker 13. The display screen 33 is for visually presenting route guidance information. The touch switch 34 is built into the display screen 33 and may be a plurality of transparent touch switches arranged in a planar matrix fashion. These transparent touch switches may be either contact switches in the form of transparent electrodes or piezoelectric switches, by way of example. This touch switch 34 is used to selectively input to the navigation apparatus information necessary for setting a starting location, destination, pass-through location, and the like.

The printer 35 prints a variety of information items as hard copies, including but not limited to maps and facility guides, as output through the communication interface 8. Each information item is also communicated to the operator from the speaker 13. Of course, printer 35 is optional.

The display 33 may be any suitable image information display device such as a CRT, liquid crystal display, plasma display, or the like. However, it is preferable that the display 33 be a liquid crystal display, which has good visibility and low weight and power consumption. Optionally, this display 33 may be a wide-screen liquid crystal display, or alternatively, a parallel combination of two or more separate liquid crystal display panels. It may be arranged to display independent information items on respective liquid crystal displays or to display continuous map information expanding between such plural liquid crystal display panels.

An image memory 10, such as a dynamic RAM (DRAM), dual port DRAM or the like, is connected to the image processor 9 which is in turn coupled to the display 33. Image processor 9 controls the writing of image data into image memory 10. Further, data is read out of image memory 10 for visual indication of an image(s) on display 33 under control of image processor 9.

The image processor 9, responsive to receipt of a graphics drawing command from CPU 2, converts map data and character data into display image data which is then written into image memory 10. At this time, images around the display image are also formed for visual presentation on display 33 for purposes of screen scrolling, and are simultaneously written into image memory 10.

An audio processor 11 is connected to the speaker 13. This audio processor 11 is connected via the CPU local bus 15 to the CPU 2 and ROM 4. CPU 2 allows audio waveform data for use in presenting voice guidance, as read from ROM 4, to be input to audio processor 11. This audio waveform data is then converted by audio processor 11 into a corresponding analog signal and is then output from speaker 13. This audio processor 11 and the image processor 9 may, in the alternative, be a general-purpose digital signal processor (DSP) or the like.

An information storage device 37 is connected via data transceiver 39 to I/O data bus 28. This information storage device 37 stores therein disk management information 38a, a program 38b for controlling the above-mentioned respective navigation operations, and data 38c such as map information. The disk management information 38a is specific information identifying or characterizing the data and program(s) stored in this information storage device 37, for example, information identifying the version of the program 38b, or the like. Data 38c may by nonvolatile data necessary for the navigation operations, such as road map data and the like. This information storage device 37 is connected to data transceiver 39 for controlling the transfer of data between it and I/O data bus 28.

The information storage device 37 of this invention is not exclusively limited to optical memories such as compact disc read-only memories (CD-ROMs) and the like, and may also be any semiconductor memory such as IC memory, IC memory card, or a recording medium, e.g. a magnetic memory such as a magnetooptical (MO) disk, fixed or hard disk, floppy disk, or the like. The data transceiver 39 is equipped with a data pickup for retrieving information from such recording media. For example, if the recording medium is a hard disk then the data transceiver 39 is provided with a magnetic signal read/write device, such as a core head or an equivalent thereof.

The data 38c of information storage device 37 may include data required for intended navigation operations, such as map data, intersection data, node data, road/street data, photograph data, destination point data, guidance point data, detailed destination data, destination read data, house-shape data, and other data. An appropriate navigation operation is effectuated using the road map data included in data 38c in a way as determined by the program 38b stored in the information storage device 37. This navigation program 38b is read by transceiver 39 from information storage device 37 and is then written into flash memory 3. Other data may include visual guidance data, audible guidance data, schematic guidance route image data, etc.

Further included as the data of data 38c is a link data file F17 in which road numbers are correlated in a one-to-one relationship with respective roads on maps, which road numbers may correspond to link numbers transmitted from the road information station associated therewith.

Additionally, the map data included in the data 38c of information storage device 37 may be either map data items of different scale of reduction or map data at a single scale of reduction. In other words, data 38c may include either maps of the same area but different from each other in their reduction scales or only map data of a single reduction scale. Where the map data of a single reduction scale is recorded, its reduction scale has been determined to ensure that detailed information is displayable, when a map is displayed on display 33, at its maximum magnification.

In cases where only a single map data item is included in data 38c, when displaying a map of a lower reduction scale on display 33, i.e. a map representing a wide geographical area (wide-area map), information is presented coarse or "thinned out." During such thinned-out display of the map data, symbol display of information pertaining to facilities and the like may be omitted in addition to a reduction of the geographical distances between adjacent roads and the like. Thus, a "thinned-out" processing is executed to give higher priority to display of larger or major facilities, while omitting depiction of other facilities from the display.

Data 38c of Information Storage Device 37

FIG. 2 shows the contents of respective data files stored as the data 38c in information storage device 37. A map data file F1 contains map data including data for a national road map, local road maps, house area maps, and the like. The road map consists essentially of roads such as main trunk roads, highways, narrow streets and the like as well as possible destinations and landmarks (facilities and the like). The house-area map is a city map with graphic patterns indicative of the contour or shape of building structures and the like with road names displayed thereon. The "Narrow streets", as this terminology is used herein, are those roads that are not used in a route search as will be later described. "Narrow streets" may be roads or streets of a width less than a predefined value and are typically city roads and/or private roads, i.e. other than a federal or state road. In other words, "Narrow streets" may be certain roads on which it would be difficult for ordinary vehicles to pass in opposite directions.

Intersection data file F2 stores data concerning road intersections, such as geographical location coordinates and names thereof. A node data file F3 includes respective nodes' geographical coordinates data for use in performing a route search on maps. A road data file F4 stores data concerning roads, such as road location, types of road and number of lanes, as well as connections for the roads concerned. A photograph data file F5 includes image data for photographs of several places subject to request for visual display, such as some facilities, sightseeing spots, major intersections, and the like.

A destination data file F6 contains data for locations and names of places, facilities and the like which are subject to possible selection as a destination, such as some principal locations and buildings, or alternatively enterprises and offices as listed in printed telephone directories.

A guidance point data file F7 includes the messages of road and traffic signs posted along roads and guidance data for guidance relating to certain locations, including the necessary intersection guidance and the like. A detailed destination data file F8 stores therein detailed data as to the destinations stored in the destination data file F6. A road name data file F9 contains road-name/title data for major roads stored in the road data file F4. A branch-point name data file F10 stores the name data for major branch points. An address data file F11 stores list data for use in searching for one desired destination, based on its address, from among those stored in the destination data file F6.

A local/area phone number list data file F12 stores therein a data listing of only the local/area telephone numbers of the destinations stored in the destination data file F6. A registered phone number file data F13 stores phone numbers which have been registered therein by manual operations of the operator, which numbers include those of specific business clients and the like. A mark data file F14 stores data for the positions and names of landmarks on the travel route and also for registered places and the like, which have been input by manual operations of the operator. A point data file F15 stores detailed data for those landmarks, etc., stored in the mark data file F14. A facility data file F16 stores data for the locations of and information pertaining to certain target locations including potential stopover places other than the presently selected destination, which target locations may be gas stations, convenience stores, parking areas or the like.

A link data file F17 stores therein data for identification of the one road in the road data file F4 corresponding to a link number transmitted as VICS information from the road information station or the like.

Content of RAM 5

Figure 3:
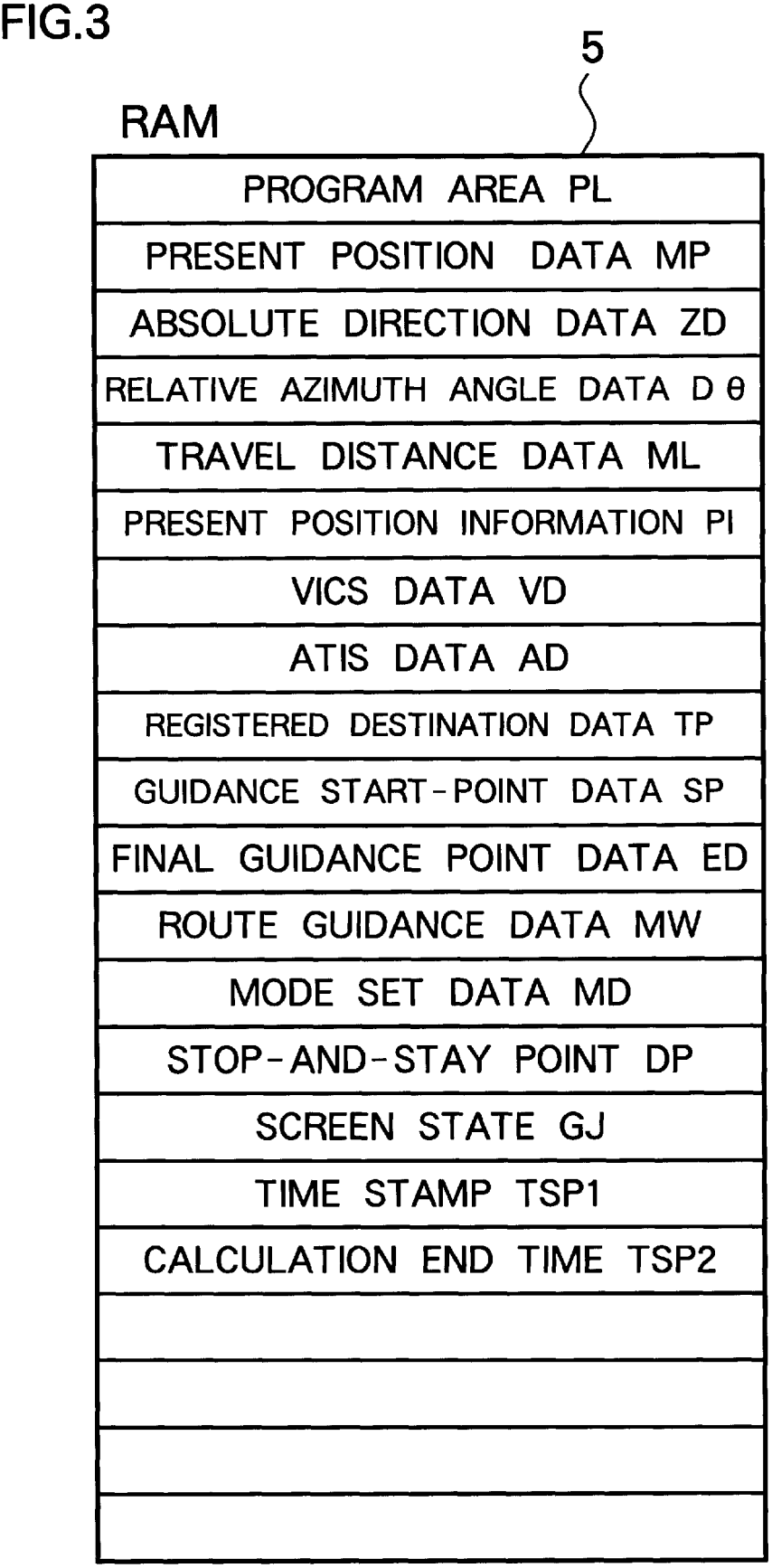
FIG. 3 is a diagram illustrating the structure of data stored in RAM 5.

FIG. 3 shows part of data stored in the RAM 5. Present position data MP is that data which represents the present position or location of the vehicle as detected by the present position detector 20. Absolute direction angle data ZD, indicative of the South and North directions, is obtained based on the information from absolute direction sensor 21. Relative azimuth angle data Dθ is data indicating the angle of the traveling direction of the vehicle with respect to the absolute direction angle data ZD. This relative azimuth angle data Dθ is based on signals received from the relative direction sensor 22.

Travel distance data ML indicates the distance the vehicle has traveled, which may be obtained based on signals from the distance sensor 23. Present position information PI is the data concerning the present vehicle position, and is based on signals received from either the beacon receiver device 26 or data transceiver 27. VICS data VD and ATIS data AD are received as input from either the beacon receiver 26 or data transceiver 27. VICS data VD or ATIS data AD is used to identify local traffic restrictions, traffic congestion, or crowded facilities such as full parking lots, in execution of certain routines as will be described later. This VICS data VD may also be used in some cases to correct error in the present vehicle position as indicated by the GPS receiver 25.

Registered destination data TP is the data that relates to an operator's registered destination and includes coordinates position and a name. Guidance startpoint data SP includes map coordinate data for the location at which the navigation operation is started. Likewise, final guidance point data ED includes map coordinate data for a point where the navigation operation ends.

Note that for the guidance start-point data SP, the coordinates of a node on a guidance road nearest to either the present vehicle position or the starting location may be used.

The reason for use of such guidance start-point data SP is that the vehicle present location according to the present position data MP can be within a facility, such as a golf link or parking area, and thus will not always be on the guidance road per se. Similarly, the guidance final-point data ED may be the coordinates of a node on the guidance route nearest to the registered destination (data TP). The reason why such guidance final-point data ED is used is that the coordinates of such registered destination data TP can be off the guidance road.

Route guidance data MW stored in the RAM 5 is the data indicative of the optimal or recommended route ("guidance route") leading to the destination, which route is determined by a route search routine executed as a later-described step SA4 or by a re-search routine. Here it should be noted that respective roads of road maps stored as data 38c in information storage device 37 are stored in correlation with their road numbers. The guidance route data MW may be organized as a queue of road numbers extending from the guidance start-point (data SP) to the final guidance point (data ED).

Mode set data MD is the data used to set a destination in a routine which will be later described. This mode set data MD is input by touch switch 34 incorporated into the laminated surface of the display 33. This mode set data MD is used to specify a mode of display on the screen of display 33. Stopover point data DP is information about facilities at which the vehicle is expected to stop and temporarily stay on the way to the destination along the guidance route.

Screen state data GJ is the data that indicates the status of visual presentation of the display 33. In other words, the display screen of display 33 is subdivided by execution of a program to be later described. Screen state GJ data indicates the mode of the current display 33, i.e. either a divided display or single display. Hence, the screen state GJ data will be rewritten or reprogrammed every time the display 33 is switched between the two modes.

A time stamp TSP1 indicates the time of issuance of the most recently received version of VICS data VD. Specifically, VICS data VD includes information on respective roads monitored by the road information station. But, because road conditions may instantaneously change, the VICS data as issued by the road information station includes time-point information indicative of when such road information was issued to show present road conditions as of a specific point in time. This time information is stored in RAM 5 as the time stamp TSP1. A calculated or predicted end time TSP2 represents a point in time when both a later-described route re-search, in accordance with information as to a traffic jam or restriction, and routines relating to such route re-search would be completed by the navigation apparatus.

Road Data

Figure 4:
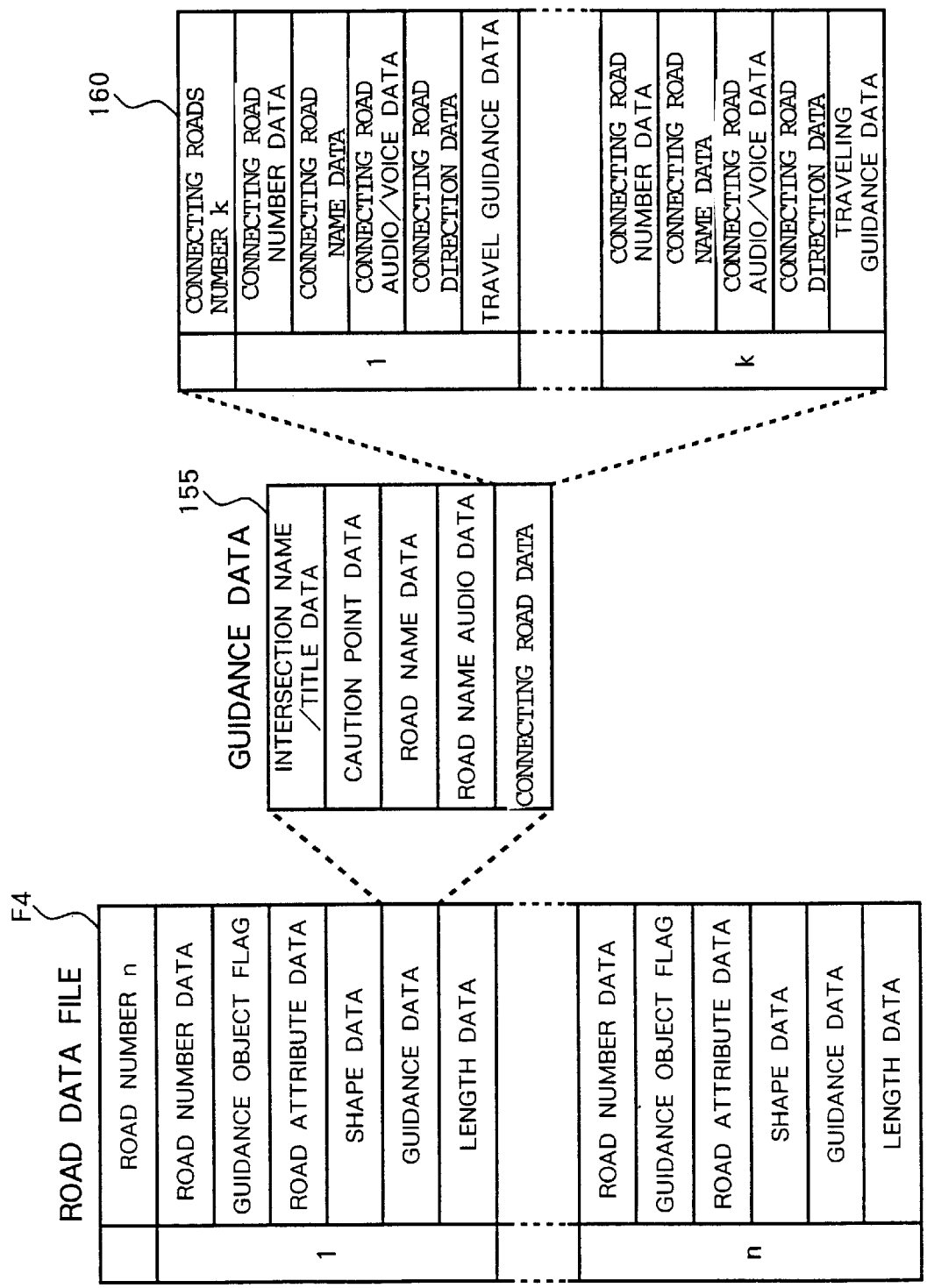
FIG. 4 is a diagram illustrating structure of a road data file F4.

FIG. 4 shows part of the road data in the road data file F4 stored in the information storage device 37. This road data file F4 contains information concerning those roads of a width greater than a predefined value and which are located in the area covered by the map data file. Representing as "n" the number of roads included in this road data file F4, road data items for n roads are contained therein. Each road data item may consist of road number data, guidance object flag, road attribute data, shape data, guidance data, and length data.

Each federal road, interstate highway and the like contained in the map data of information storage device 37 is subdivided into minimal lengths or "units." An identification number for each road thus divided is the road number data. The guidance object flag in road data file F4 is a value "1" for a road for which guidance is available ("guidance road") or "0" for a "non-guidance road." Note that the guidance roads are roads which are wider than a predefined width, e.g. 5.5 meters or greater in width, such as trunk roads, general roads and the like, and which are treated as available roads in a route search. The non-guidance roads are those streets which are narrower than the predefined width, e.g. less than 5.5 meters, such as footpaths, alleys, and the like and which will not be subject to any route search, i.e. will not become part of a guidance route. Optionally, the guidance roads may be state roads and those roads higher in rank than state roads, while the non-guidance roads would be the remaining roads, i.e. lower in rank than the state roads.

The road attribute data is data indicating road attributes, such as elevated tracks, subway roads, highways, toll roads, and the like. The shape data is the data indicative of the shape of each road. For example, the shape data is configured from data for coordinates of the starting and end points of a road and coordinates of each node which lies between the starting and end points.

The guidance data may consist of intersection name/title data, caution point data, road name data, road name audio data, and course data. The intersection name data is the data which represents, when the road end point is an intersection, the name or title of such intersection. The caution point data is data concerning certain caution points on roads, such as railroad crossings, tunnel entrances, tunnel exits, lane merge points, etc. The road name audio data is the data representative of road names usable during audible presentation of route guidance.

The connection data is the data regarding connecting roads along the guidance route leading to the destination, which may consist of k number of connecting roads or road segments and data for each such connecting road. The connection data may include connection road number data, connection road name data, connection name audio/voice data, travel direction data, and travel guidance data.

The connection road number is indicated by the connection road number data. The title or name of a connecting road is indicated by the connection name data. The connection name audio data is audio data for use in presenting the connection name audibly or by voice guidance. The direction data gives the direction of travel for each connecting road. The travel guidance data is data for use in providing travel guidance, e.g. directing a lane change to the right side lane, to the left lane, or directing the driver to remain in the center lane in order to enter a desired connecting road. The length data is the data indicative of the length between road starting and end points, length from the start point to each node, and lengths between adjacent nodes.

VICS Data VD

The structure of VICS data VD as received via the beacon receiver 26 will now be explained. VICS data VD may include data for degree of traffic congestion GD, congestion start position GST, congestion length GL, traffic restriction information GK, travel time RT and the like. These data items are linked to one road as represented by a VICS link number VRB. The VICS link number as used herein refers to numbers used by the road information station, that transmits the VICS information, to individually identify roads under information-management by the road information station.

Accordingly, the VICS link numbers will not always coincide with the road numbers in the road data file F4 stored in the information storage section 37. A correlation between the road numbers of the road data file F4 and the VICS link numbers is provided by the link data file F17. This link data file F17 will be described in detail later. However, if the road numbers of road data file F4 and the VICS link numbers VRB correspond in a one-to-one relationship, the link data file F17 is not required.

The congestion degree data GD is the data indicative of the degree of traffic congestion of a road as designated by its VICS link number. Accordingly, when the congestion degree GD has a relatively high numerical value, this tells the navigation system that the subject road has a traffic jam rendering it difficult for the vehicle to pass. Alternatively, this congestion degree GD may be a value which simply represents the degree of traffic hindrance by traffic jams, crowds, heavy traffic, or other conditions. The congestion start position GST is the start or "head" point of traffic congestion with respect to a road as designated by its VICS link number. Note here that this congestion start position GST may be a relative geographical distance from the starting point of a road as designated by VICS link number VRB, or alternatively may be real geographic coordinates. The congestion length GL is data derived from a measurement of a queue of land vehicles included in such congestion in terms of a geographical distance.

The restriction information GK is the data which represents restrictions on travel of a road as designated by its VICS link number. For example the restriction information GK may indicate that a road of interest is under construction, congested by events, or closure. The travel time RT defines the time predicted/calculated for a vehicle to travel the entire road segment as designated by a VICS link number at the expected speed, e.g. posted speed limit.

It should be noted that since real roads include lanes in two directions, the VICS link numbers are each unique to lanes in one of those two directions. Information transmitters installed along roads, such as radiowave beacons, optical beacons and the like, are operable to transmit VICS data VD which includes data for congestion degree GD and travel time RT for each road segment experiencing a traffic jam, congestion, or the like.

On the other hand, when a private vehicle equipped with the navigation apparatus of the present invention passes immediately beneath or above one of the information transmitters, its transmitted VICS data VD is received and then stored in RAM 5. Upon receipt of this VICS data VD, the point in time of issuance thereof is also stored in RAM 5 as a time stamp TSP1. The traffic congestion on a given road can vary with time and the VICS data is received every time the vehicle passes by a information transmitter. Accordingly, it will possibly happen that, depending upon the point in time of issuance, the presently transmitted VICS data may be unchanged from the prior received and stored VICS data VD in its substantive content. In view of the foregoing, the time stamp TSP1 is constantly monitored in order to eliminate unnecessary, recurrent execution of route searching based on updated VICS data which is little changed.

Link Data File F17

FIG. 5 is a diagram showing a configuration of the link data file F17 as recorded in the information storage device 37. As described previously, the VICS link numbers of VICS data VD are different from the road numbers of the road data file F4 recorded in information storage section. Hence, in order to identify which road number of the road data file F4 corresponds to the link number VRB of VICS data VD as presently received, the link data file F17 is recorded as a collated check list (table) in information storage device 37.

Typically, a road designated by a single VICS link number VRB will not be in a one-to-one correspondence with a road recorded in the information storage section 37. In other words, a road designated by such VICS link number VRB can correspond to roads designated by a plurality of road numbers in information storage device 37.

For example, in FIG. 5, a road designated by VICS link number VRB(1) corresponds to those roads as designated by road numbers DR101, DR102, DR103, DR104 in the road data file F4 of information storage device 37. Likewise, a VICS's road designated by VICS link number VRB(n) may correspond to those designated by road numbers DR601, DR602, DR603, in the road data file F4 of information storage device 37.

Figure 6:
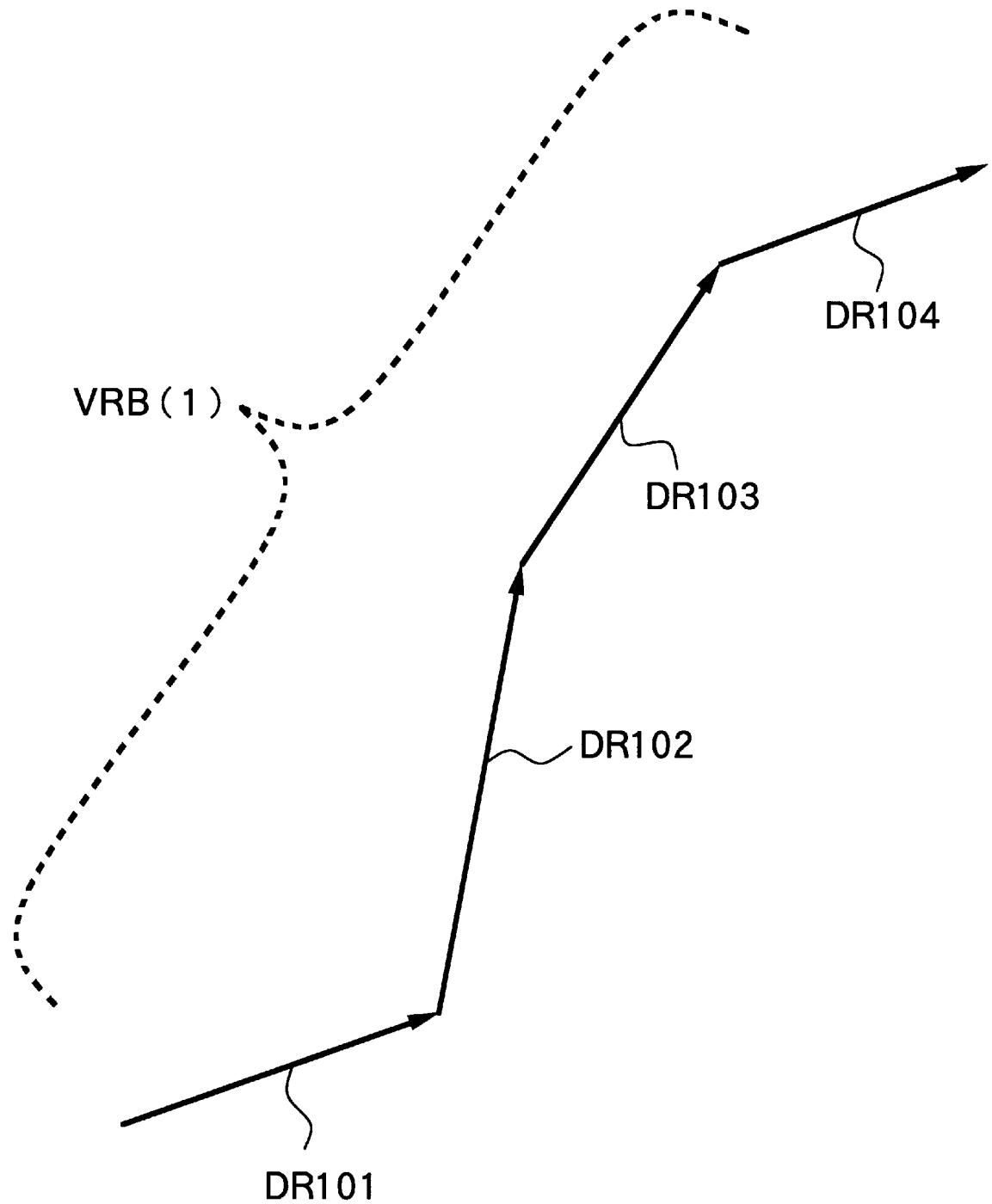
FIG. 6 is a diagram showing a relationship between VICS link numbers VRB and road numbers DR.

FIG. 6 is a diagram indicating the relationship of VICS link number VRB(1) and road numbers of road data file F4 as recorded in the information storage device 37. Road numbers DR101, 102, 103, 104 of the road data file F4 may correspond to a road on a map image to be visually indicated on the display 33. The VICS link number VRB(1) as transmitted from the road information station corresponds to a length of road in the road data file F4 composed of the road segments designated by these road numbers DR101, 102, 103, 104.

In this manner, the correspondence between a VICS link number VRB for a given road as defined by the road information station and the road number(s) DR for individual road segments, constituting the road data file F4 recorded in the information storage device 37, can be obtained through use of the link data file F17. Thus, using this link data file F17, the navigational system can promptly identify those roads of the road data file F4 to which the received VICS data pertains.

Additionally, as discussed supra, it is also possible to render VICS link numbers of VICS data completely coincident with the road numbers DR of road data file F4, in which case the link data file F17 is no longer required.

Main Routine

Figure 7:
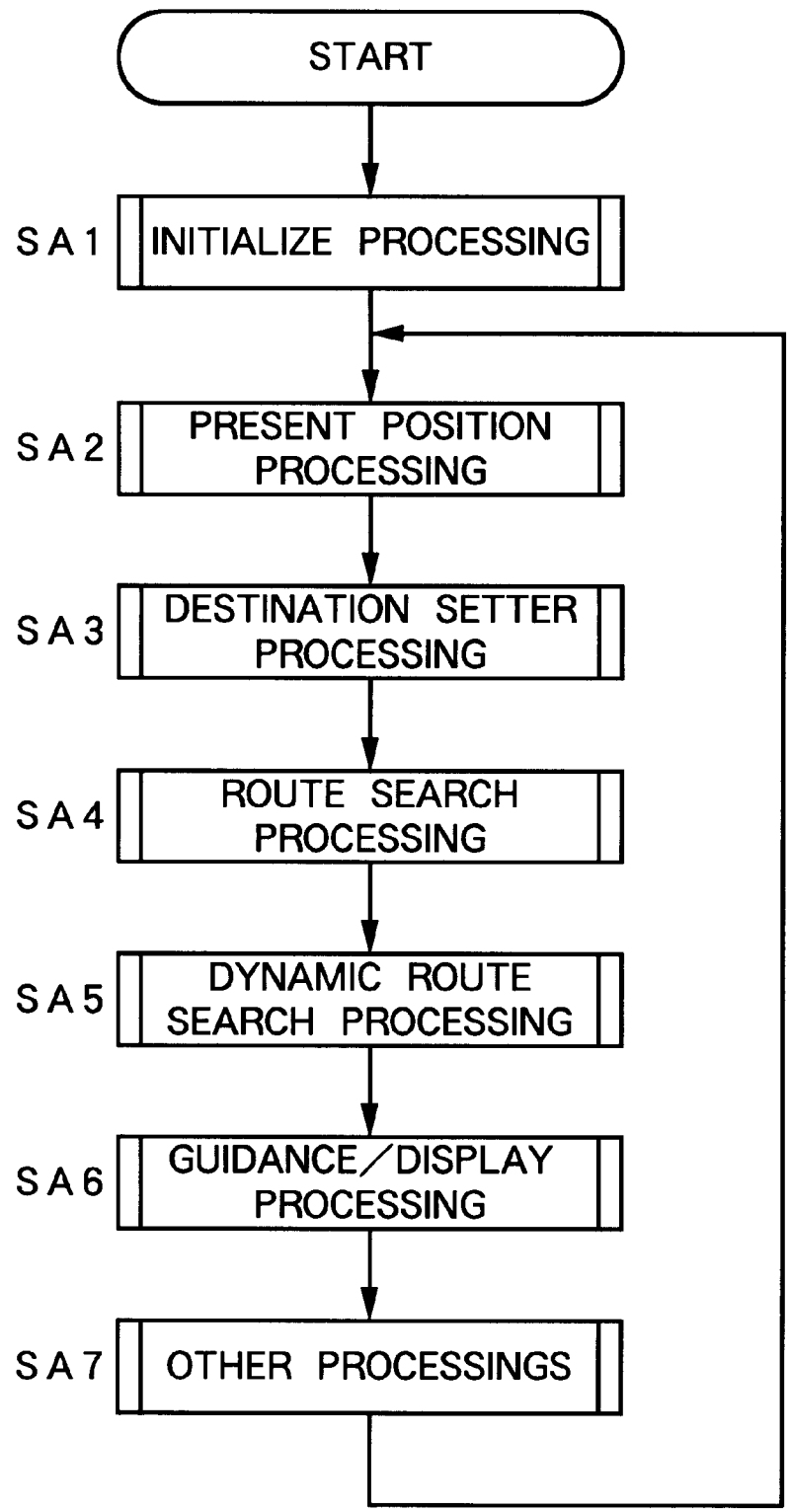
FIG. 7 is a flow chart of the main routine for overall operation of the entire navigation system.

FIG. 7 shows a flow chart of a preferred main routine to be executed by the CPU 2 of the navigation apparatus in accordance with the present invention. Execution of this main routine is started upon turning on electric power to the navigational apparatus and is terminated when power is turned off. This on/off of power may be performed either by turning on and off the navigation apparatus' power supply per se or by turning on and off of the engine ignition switch of the vehicle.

The program is initialized in step SA1 of FIG. 7 as follows. First, the navigation program is read out of the information storage device 37. The read navigation program is then duplicated (installed) in flash memory 3. Thereafter, the program of flash memory 3 is executed. Further, the CPU 2 operates to clear the general-purpose data storage area of respective RAMs such as the working memory of RAM 5, image memory 10 and the like.

Duplication or "copying" of the program into flash memory 3 is executed when a new program 38b is installed in the navigation apparatus by replacing one information storage device 37 with another. Thus, copying of a new program into flash memory 3 is done only when a new information storage section 37 is first installed in the navigation apparatus. Accordingly, when no new information storage device 37 is found upon check of the disk management information 38a, the step of copying a program into flash memory 3 is skipped.

After the initialization is completed in this way, there will be executed cyclically a present position determination (step SA2), destination setting (step SA3), route searching (step SA4), dynamic route searching (step SA5), guidance/display ouput (step SA6) and other processings (step SA7). Note here that duplicative or recurrent execution of the destination setting (step SA3) and route searching processing (step SA4) will be skipped unless there is change of the destination or the vehicle deviates from the present guidance route ("spin-off").

In present position detection (step SA2), the geographical coordinates (longitude, latitude and altitude) are detected for a vehicle which exemplifies a "land movable object" having the navigation apparatus built therein. More specifically, the GPS receiver 25 receives signals from a plurality of satellites orbiting around the Earth. The signal from each satellite is used to detect the coordinate position of each satellite, signal transmission time for each satellite, and signal reception time at the GPS receiver 25. The distance from each satellite may be obtained from these items of information. Based on this distance from each satellite, the coordinate position of the vehicle on the ground is determined. This resulting vehicle coordinate position is stored in RAM 5 as present position data MP. It will possibly happen in some cases that this present position data MP will be modified depending in accordance with information received as input by the beacon receiver 26 or data receiver 27.

In the present position determination (step SA2) also, the absolute direction data ZD and relative azimuth angle data Dθ, as well as travel distance data ML, are obtained by utilizing the absolute direction sensor 21, relative direction sensor 22 and distance sensor 23. The absolute direction data ZD, relative azimuth angle data Dθ and travel distance data ML are used to perform an arithmetic routine for determining the present vehicle position. The present vehicle position thus obtained by this processing is compared with map data stored included in the data 38c of information storage device 37 for appropriate corrections or amendments to ensure that the present position is accurately displayed on a map screen. This correction processing enables accurate acquisition of a present vehicle position even when there is no receipt of GPS signals, such as when the vehicle is within a tunnel.

In destination setting processing (step SA3), the geographical coordinates of any destination desired by the operator may be set as registered destination data TP. For example, the coordinates of a destination may be designated by the operator by use of either a road map or a house area map as displayed on the display 33. Alternatively, the destination may be specified by the operator from an item-dependent list of destinations as displayed on display 33. As a result of this destination setting, the information data for the designated destination, such as the geographical coordinates thereof, is stored in RAM 5 as the registered destination data TP.

In the route search subroutine (step SA4), a search is conducted to determine an optimum route from the guidance starting point, as identified by data SP, to the final guidance point, as identified by data ED. The term "optimum route" as used herein may refer to, for example, a route by which the vehicle is capable of reaching the destination with either a minimum travel time or a minimum travel distance or, alternatively, with weighing favoring (giving priority to) wider roads, according to the preference of the operator. In the case of selection of a highway, preference may be given to that highway which enables the vehicle to arrive at its destination within a minimum time or a minimum travel distance.

The guidance starting point data SP is either the same data as the present position data MP or node data for a node on a guidance road near the present position data MP. An "auto re-route" mode is also available which attempts, where the present vehicle position is off of the guidance route, to automatically again search or "re-search" for another optimum route leading from this off-route present position to the destination. Unless the "auto re-route" mode is set, such route re-searching will not be performed. Also, when more than one stopover point is set, it will occur in certain cases that a route by way of such a point is searched.

After execution of the route search in step SA4, a dynamic route search subroutine (step SA5) is then executed. In this dynamic route search subroutine, a decision is made to determine whether the guidance route is to be changed based on the VICS data received. As previously described, the VICS data is received as the vehicle with the navigation apparatus built therein passes through a location near a transmitter device for transmitting VICS data, such as an antenna. In the case of using telephone networks, VICS data is received only at the time of communication via telephone links. The VICS data contains therein information for respective roads with traffic difficulties such as congestion, impassability or the like. Note that in the case of using FM multiplex radio waves, such VICS data may be received constantly.

Thus, the received VICS data VD is used to detect traffic difficulties, such as congestion, restriction or the like, ahead on the guidance route. Upon detection of the presence of such traffic difficulties, a judgement is made as to whether or not a route change is to be made, based upon whether or not sufficient time is available for execution of a route change and the series of processing tasks associated therewith. Where a route change is made, a before-the-change route and an after-the-change route are displayed together by execution of guidance/display processing in the next step SA6. This route change routine will be described later.

The guidance/display processing (step SA6) uses the guidance route as obtained by either the route search routine (step SA4) or a route re-search and visually depicts the guidance route on the display 33 with the present vehicle position being centrally placed thereon. Additionally, this guidance route is displayed on display 33 in such a way as to provide for visual identification of that route on a map image. For example, the guidance route may be displayed in a characteristic color differing from that of the remainder of the map displayed on display 33. Further, road guidance information is audibly output from speaker 13 to assist the operator in satisfactorily travelling the guidance route. As this operation is done, a variety of guidance information items are displayed on display 33, as necessary or appropriate. Note that the image displaying the guidance routes may be either in the nature of a road map of the nearby area surrounding or ahead of the present vehicle position or a house area map for the nearby area.

Switching between the road map data and house-area map data may be in accordance with certain criteria as follows. For example, the switch may be made depending upon the distance from the present vehicle position to a guidance point (destination, stop-over point, intersection, or the like), the vehicle speed, or the size of the displayable area. Alternatively, switching between the two display modes may be responsive to the operator's manual operation of a switch. Further, an image-magnified map covering an area near or around the guidance point (destination, stop-over point, intersection, etc.), is visually presented on display 33. Of course, a simplified guidance route image, other than a road map, may alternatively be displayed on display 33. In a simplified guidance route image, for example, display of geographical information may be eliminated and only the minimum necessary information items are displayed, such as the guidance route and either a destination or a stop-over location, a present vehicle location, and the like.

After completion of the guidance/display of step SA6, a procedure labeled "other processings" (step SA7) is executed. In "other processings," the nearest facility in a specified category can be determined on a case-by-case basis. This nearest facility processing refers to the process of searching for and designating one or more stop-over points or locations (facilities or the like) other than the registered destination. This data concerning such stop-over points may be defined by use of maps being displayed on display 33 or respective information items. This nearest facility processing is executed in a manner similar to that of the destination setting processing of step SA3.

Also, in the "other processings" step, a determination is made as to whether or not the present vehicle position is on the guidance route. Specifically, upon detection of a deviation of the vehicle from the guidance route, certain status flags are set for initiation of respective routines to initiate a route re-search. Here a judgement is also made as to whether or not any change of destination has been commanded by manual input by the operator's operation of a switch.

After completion of the step SA7 subroutine, the main routine (FIG. 7) beginning with the present position processing (step SA2), is repeated. Additionally, when the vehicle has arrived at its destination, the route guidance/display subroutine is also terminated, causing the system to return to the main routine at step SA2 again. In this way, the steps of the main routine, from step SA2 to step SA7, will be sequentially repeated.

Dynamic Route Search Subroutine (Step SA5)

Figure 8:
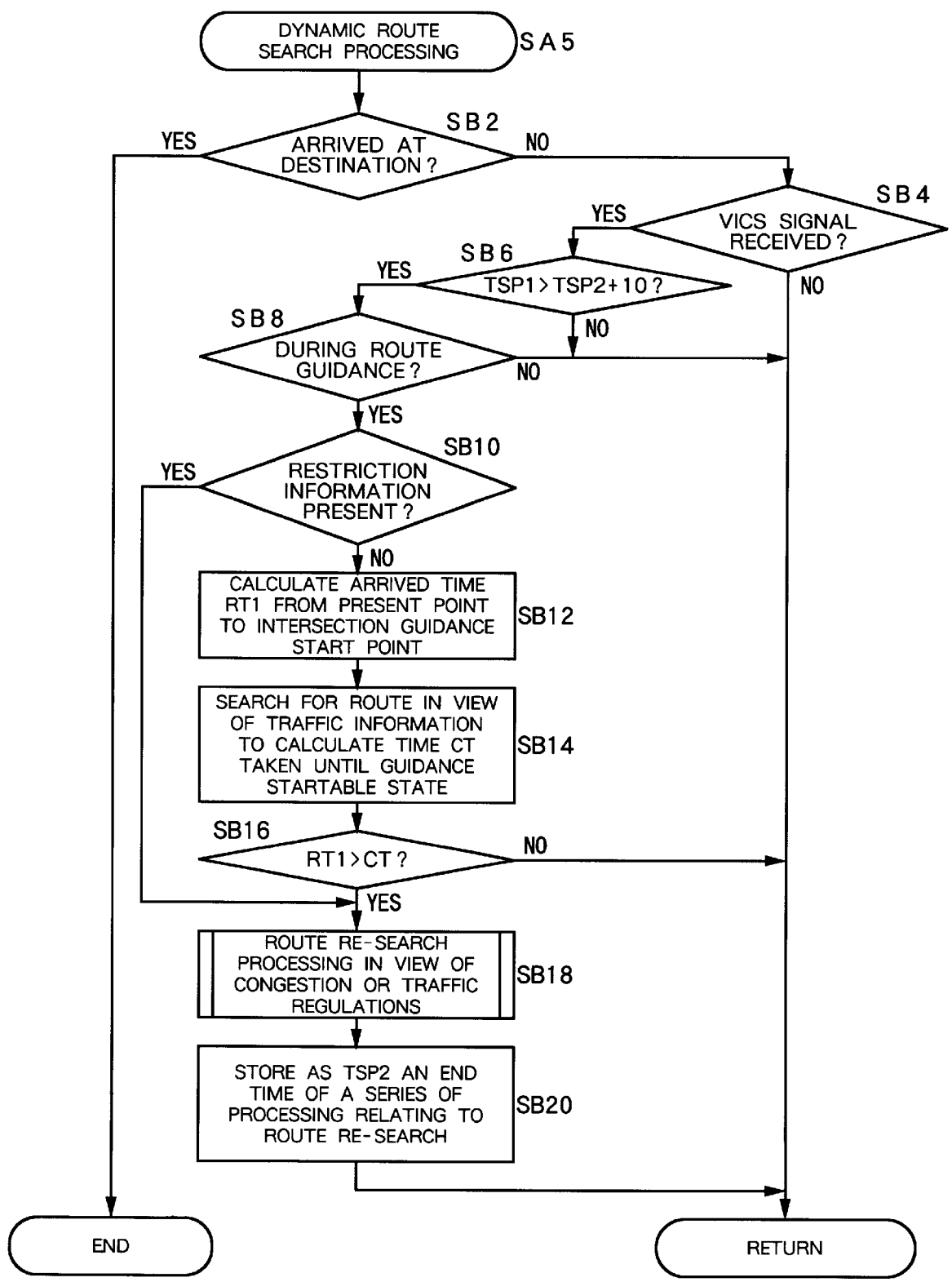
FIG. 8 is a flow chart of a dynamic route search routine.

FIG. 8 is a flow chart of a dynamic route search subroutine of this preferred embodiment. In this dynamic route search subroutine, a decision is made as to whether or not a route change has been made based on the received VICS data VD and the issuance time thereof as previously described. When such a route change has been made, a subroutine (step SA5 in FIG. 7; FIG. 8) is executed for simultaneously displaying the after-the-change route and its immediate prior "old" route on the display 33.

In the subroutine of FIG. 8, first a decision is made as to whether or not the vehicle has arrived at the initially set destination (at step SB2). Optionally, the same decision may be made when the vehicle has reached a location that is within a specified distance from the registered destination. When the vehicle has arrived at the destination or, optionally, a point close thereto, the subroutine of FIG. 8 is not executed. This is because a route change is undesirable where the vehicle is near the destination. Conversely (and optionally), a route change may be performed even where the vehicle has come close to the destination. By way of example, in a case where the final guidance point on the guidance route, near the destination, is on a road blocked due to construction, such a route change is preferably performed or, alternatively, the existence of the traffic impasse is communicated audibly and/or visually to the driver.

Where it is determined at step SB2 that the vehicle is still en route to the destination, it is then determined whether or not a VICS signal (VICS data) is being received. The VICS signal will not be received unless the vehicle passes through an area with the transmitting range one transmitter device, i.e. a device which transmits a signal in the form of an optical beacon, a radiowave beacon, or an equivalent thereof. Of course, in the case of VICS data received via a telephone network, reception is unavailable unless communication is first established with the VICS center via a telephone link and, without establishment of a telephone link, the subroutine will not be initiated and the system will return to the main routine of FIG. 7.

On the other hand, when a VICS signal is received, the issuance time of the road information of the VICS signal is stored in RAM 5 as a time stamp TSP1. The subroutine of FIG. 8 (at step SB6) next determines whether the point in time indicated by this time stamp TSP1 is after lapse of a predefined period of time from the last end time point (calculation step TSP2), i.e. from completion of a series of processings based on the prior received VICS data. Thus, the time of completion of such a series of processing operations accompanying a route change (route re-search), based on the last received VICS data, is stored in RAM 5 as the calculation completion time TSP2. For example, it is determined whether the time stamp TSP1 of the presently received VICS data is a time after lapse of a time period equal to the calculation completion time TSP2 plus ten (10) minutes. This allows for lapse of a relatively short time period such as 10 minutes and the possibility that the traffic situation may change suddenly on that portion of the present guidance route yet to be travelled. Further, a route re-search requires significant time. Thus, recurrently performing the time-consuming route re-search and its related processings within a short time period can disturb or prevent successful attainment of smooth navigation. Further, repeating the re-search routines may merely lead to the same guidance route.

Accordingly, the series of processings of FIG. 8 are designed not to start when the time stamp TSP1 of the presently received VICS data is later than predefined time beyond the calculation end time TSP2. In other words, the system reverts to the main routine of FIG. 7. Then, when the time stamp TSP1 is later, by the predefined time period, than the calculation completion time TSP2, the steps following step SB8, such as the route re-search, are executed. While in this embodiment the time difference between the time stamp TSP1 and calculation end time TSP2 is set at about ten minutes, such difference may be either greater or less than such value.

Alternatively, in comparison of the time stamp TSP1 with the calculation end time, the count value of a single pulses by a counter may be used. For example, a route re-search based on VICS data may be initiated by a count operation which starts at the calculation completion time TSP2 and ends with the record time of time stamp TSP1 at twenty (20) or more counted pulses, for example. A situation-dependent, incremental or decremental count value may also be used, such as a travel distance, number of executions of the present position detection routine, or the like. In other words, a re-search may be set to start, using VICS data, when the vehicle has moved a given distance or more after the calculation end time TSP2.

In FIG. 8, if the point in time of the time stamp TSP1 is approximately ten minutes past the calculation end time TSP2 ("YES" in step SB6), the system then determines whether or not guidance information associated with a guidance route is being output (at step SB8). In other words, whether or not navigation is active is judged. If not during route guidance, the subroutine of FIG. 8 is skipped because of lack of need for any route change based on VICS data and the system returns to the main routine of FIG. 7. If during route guidance, the steps subsequent to step SB10 are executed.

At step SB10, it is judged from the information contained in the presently received VICS data whether there is a traffic restriction (information GK), such as complete traffic prohibition or the like ahead on the guidance route. If such restriction information GK indicating conditions impeding travel, such as a closure to traffic or the like, is found, then a route re-search routine is executed for effecting a route change (step SB18).

However, if no restriction information GK is found to be associated with that portion of the present guidance route yet to be travelled, step SB12 is then executed. More specifically, a time RT1 is estimated (at step SB12) for the travel time required for the vehicle to travel from its present location to a road intersection ahead where the vehicle is expected to change its travel direction, e.g. turning to the right or the left. This is done by accumulating, for respective road segments constituting the guidance route, geographical distances of from a present vehicle location to that intersection by use of the road data file F4 and further by calculating an arrival time RT1 under the assumption that the vehicle will travel the resultant distance at a certain speed. Note that the "intersection" which is the subject of such a calculation may also be an intersection with branches in more than two turnable directions, i.e. presenting more than two possible changes in travel direction. More precisely, the distance to the intersection used in calculating arrival time RT1 is the distance between the present vehicle location and a certain point that is a predefined distance before the center of a road branch such as an intersection. At a branch such as an intersection where the vehicle is expected to turn to the right or the left, a warning or confirmation of a turn ahead is made when the vehicle arrives at a location a predefined distance in advance of such a branch or intersection. Furthermore, where the road the vehicle is traveling has a plurality of lanes, it is necessary that the vehicle operator change to the proper lane in advance of the turn.

Accordingly, the location must be a sufficient distance ahead of the branch center point to allow for completion of presentation of such information for appropriate action to be taken by the vehicle operator. For example, although the lead distance from the turn will depend on the legal speed, in the case of an ordinary road, it may be about 400 meters before the intersection. For highways or wide roads with plural lanes, a point approximately 800 meters in advance of the turn may be preferable. Accordingly, the distance between such a point a predefined distance in advance of the turn and the present vehicle location is used for calculation of the arrival time RT1.

The speed assumed (predicted) in calculation of the arrival time RT1 may be the vehicle's average running speed, i.e. an average speed based on its history of speeds for a past predetermined period. For example, with the vehicle's speed measured by the speed sensor 24, the average value of several speed measurements obtained from speed sensor 24 may be used for calculation of the aforesaid arrival time RT1. Alternatively, the assumed speed may be calculated based on the time taken for the vehicle to travel a predetermined distance, as determined by distance sensor 23. Another possibility is that the assumed speed be taken as the legal speed limit of a typical road.

The received VICS data VD is used to determine a calculation time CT required to conduct a search for a suitable route that detours any traffic difficulties on the previously determined guidance route (step SB14). Of course, this calculation time CT necessary for such route re-search will vary in proportion to the geographical distance between the present vehicle position and the final guidance point. This calculation time CT may also be affected by processing speed of CPU 2 and the number of roads to be searched. However, time CT is predictable by means of statistical or empirical schemes. For example, a specific correlation may be prestored as data 38c in the form of a correspondence table providing a correlation between distances between the present vehicle location and a final guidance point and necessary re-search calculation times CT.

In step SB14, the calculation time CT is obtained from the aforementioned correspondence table. Alternatively, the relationship between the route search distance and its required calculation time CT may be represented by a simple linear function based on statistical values and/or experience. Then, the linear function (equation of proportion) is pre-stored in either data 38c or ROM 4. The calculation time CT may be numerically defined by entering the distance into this linear function.

The calculation time CT may also include, in addition to the guidance route search time, the time required to initiate guidance for the newly determined guidance route. Such time required to initiate guidance is that time typically required to form map images for use in displaying the new guidance route and to present this new guidance route on display 33 while simultaneously rendering available presentation of certain information pertaining to the new guidance route.

Further, the system may permit route re-searching only in cases where the calculation time CT is less than the time RT1 required for the vehicle to reach the intersection guidance start point. Alternatively, count values generated by a counter may be used for measurement of the arrival time RT1 and calculation time CT. A direct comparison between distance values may also be used. By way of example, the route re-search may be allowable only if the distance between vehicle's present location and a certain point is greater than or equal to a predefined distance, the certain point being a point near the road with traffic difficulties, a point where travel direction is to be changed immediately before reaching the traffic difficulty, or a point where the vehicle is to turn to the right or left for following the present guidance route.

Of course, in a route re-search based on VICS data VD, the route re-search is limited to those roads free of traffic difficulties as indicated by VICS data VD; however, the entire route covering from a present vehicle position to a final guidance point may be subjected to re-searching. Optionally, in step SA4, only a detour route is re-searched, the detour route being a route which couples intersections on the present guidance route, with the traffic difficulty being located between those intersections. This detour route and the original guidance route may be combined or "synthesized" together.

In summary, based on the present guidance route, a search is made for detour route which couples (1) a branch point BB1 between the present vehicle location and the nearest traffic difficulty and (2) a branch point BB2 that lies between the last traffic difficultly and the destination along the guidance route. This detour route may replace road segment (s) of the previous guidance route having such a traffic difficulty, providing a new guidance route.

Once the calculation time CT has been numerically defined (step SB14), it is then compared with the arrival time RT1 to determine which one is greater (step SB16). If the arrival time RT1 is less than calculation time CT, then steps subsequent to step SB18 are skipped (omitted), causing the procedure to return to the main routine of FIG. 7. On the contrary, if arrival time RT1 is greater than calculation time CT, then a search is conducted for a guidance route that detours any road segments with traffic difficulties, as indicated by VICS data (step SB18).

Thus, prior to the vehicle's arrival at the next intersection where the present guidance route requires a turn to the right or to the left, if it is judged that a search for a detour route based on updated VICS data and reconstruction of the guidance route are possible, actual execution of a detour route search is permitted. This route re-search, where permitted, may cover the entire distance between the present vehicle position and the destination to provide a new guidance route consisting of of "normal" roads, i.e. roads without traffic difficulties or, alternatively, may be limited to a relatively short distance which only detours the road segment(s) with traffic difficulties. Further, the re-search scheme may be selected on a case-by-case basis, depending upon whether or not the present vehicle location is near the destination. For example, where the vehicle approaches a specified point falling within an area of a predefined radius with the destination at its center, the re-search scheme may be that which covers the entire distance to the destination; otherwise, only route segments detouring roads with traffic difficulties may be searched.

In step SB12, where intersections where the vehicle is required to turn to the right or to the left are absent along the guidance route, a specific branch point such as an intersection immediately before a congested road segment will be regarded as the reference point. A predicted time necessary for arrival at this branch point is treated as the arrival time RT1.

The point in time when the route re-search is completed and further a new guidance route is brought to a state that enables visual presentation thereof on the display 33 and is stored in RAM 5, is taken as the calculation end time TSP2 (step SB20). Thereafter, the procedure returns to the main routine of FIG. 7.

Guidance/Display Subroutine

Figure 9:
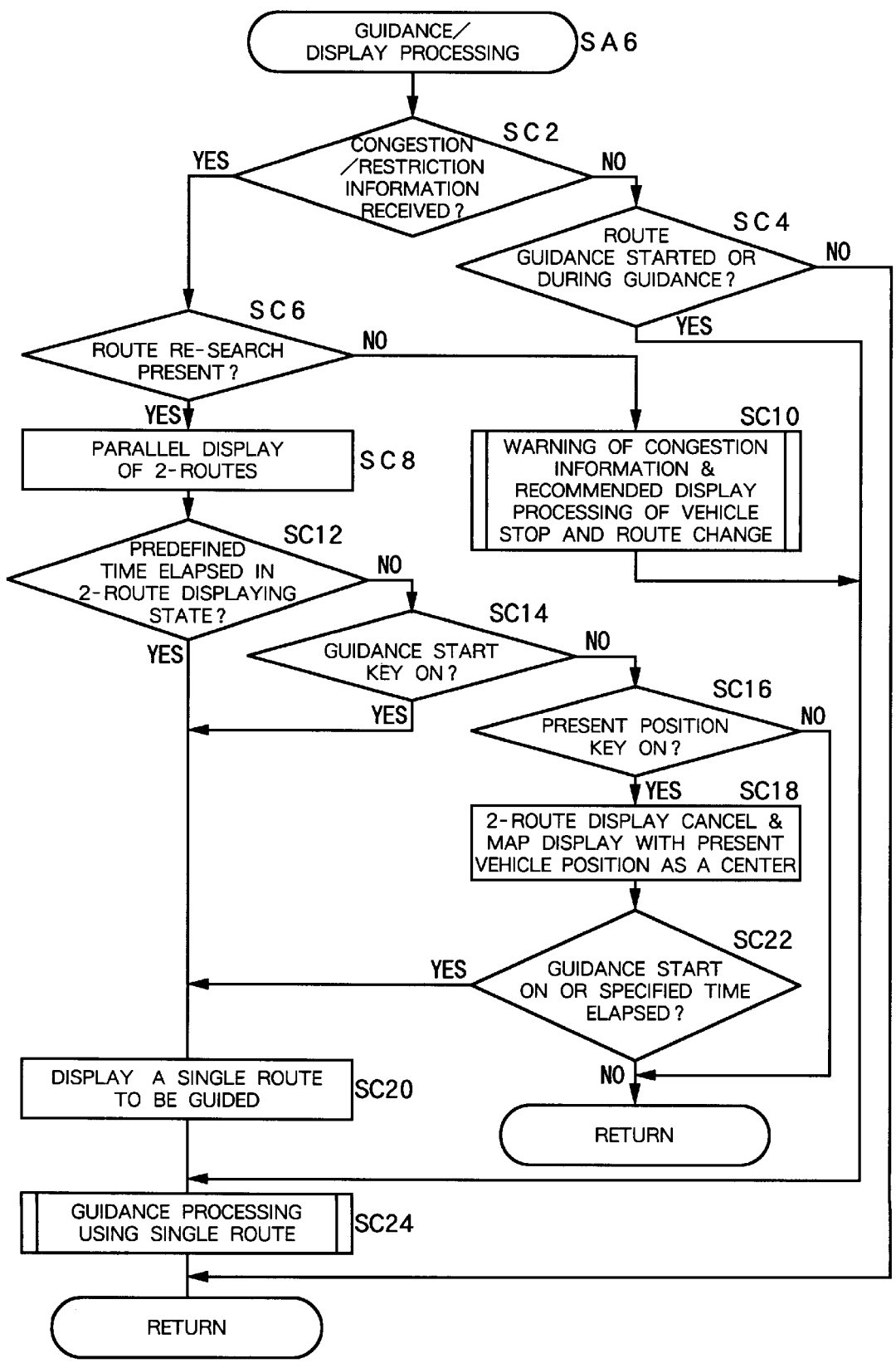
FIG. 9 is a flow chart of a guidance/display routine.

FIG. 9 shows a flow chart of the guidance/display subroutine (step SA6 in FIG. 7). The explanation of this guidance/display subroutine will be directed mainly to the state after the route re-search based on VICS data VD has been completed. First, it is judged whether congestion or traffic restriction information has been received (step SC2). In other words, it is determined based on VICS data VD whether a road suffering from a traffic difficulty is detected along the guidance route. This judgment at step SC2 may alternatively be made by detecting presence or absence of VICS data VD. When no VICS data VD has been received, the next step SC4 is executed and when VICS data VD has been received the subroutine goes to step SC6.

Where there are no road segments for which congestion or restriction information has been received, along the guidance route ("NO" in step SC2), the status of operation of the navigation apparatus is determined, i.e. route guidance in progress, or before initiation of route guidance (step SC4). If during route guidance, the system then provides guidance for a single guidance route (step SC24). In other words, the system executes guidance including audible travel directions, visual presentation of map images on display 33, and the like. Thereafter, the procedure is returned to the main routine of FIG. 7.

However, if route guidance has not been initiated, the processing is immediately returned to the main routine of FIG. 7, as in interruptions of operation of the navigation apparatus.

Also, if it is judged that information as to either traffic congestion or restriction has been received ("YES" at step SC2), then it is determined whether a route re-search is currently in progress (step SC6). In other words, it is determined whether a dynamic route search, based on updated data, is in progress ("YES" in step SC6), then both the new route determined by the re-search and the "old" guidance route are visually presented on display 33 at the same time (step SC8). Thereafter, the system determines if a switch has been actuated by the user for issuing a command to start guidance.

It is then judged whether the dual display (re-searched route and old route) on display 33 has been continued for a specified period of time (step SC12). In other words, if no key operations are performed by the user in the 2-route display mode ("YES" in step SC12), then step SC20 is executed to provide guidance for the new ("re-searched") guidance route.

However, if a predefined time has not yet elapsed ("NO" in step SC12), then a judgement is made as to whether or not a guidance starter key has been operated (step SC14). In other words, the system determines whether or not an instruction has been issued to initiate guidance during such a 2-route display, by detecting presence or absence of an ON signal from the touch switch 34. If the guidance starter key has been pressed ("YES" step SC14), then only the new route determined by the re-search is visually presented on display 33 (step SC20).

On the contrary, if the guidance starter key has not been depressed, the system then determines whether a present position key has been depressed (at step SC16). When the present position key has been depressed, a map is displayed on display 33 with the present vehicle position at its center (step SC18). However, if the present position key has not been depressed ("NO" in step SC16), the program is not further executed, permitting retainment of the 2-route display mode, and then the procedure returns to the main routine of FIG. 7.

If "YES" at step SC16, then a map is visually presented on display 33 with the present vehicle location being centrally located thereon and it is then determined whether the guidance starter key has been activated, or alternatively, whether a predefined time has elapsed (step SC22). If such a key operation has not been executed, the map image with the present vehicle position at its center continues to be displayed. In other words, the program returns to the main routine of FIG. 7. On the contrary, upon activation of the guidance starter key or, alternatively, upon lapse of such a predefined time ("YES" in step SC22), the guidance route determined by search is visually presented on display 33 (step SC20).

When the re-searched route is presented on display 33 in response to depression of the guidance starter key (step SC20), guidance is initiated for the re-searched route (step SC24). Then, the program is returned to the main routine of FIG. 7.

If the judgments at steps SC2 and SC6 indicate that no dynamic route search was performed, even upon receipt of information as to congestion or restriction, a warning message is displayed at step SC10. Specifically, while VICS data is received, if the judgment is made that the vehicle is near the intersection where the vehicle is to change its running direction and that sufficient time is not available for execution of a route re-search, a caution indication is visually presented on display 33 to inform the vehicle operator of the fact that no route re-search will be performed.

For example, the display 33 may show an indication informing the vehicle operator of congestion ahead on the guidance route and also display an indication suggesting that the vehicle stop on a road side. Likewise, displayed is an indication suggesting activation of a route re-search key (step SC10). One or more of these indications may be displayed in combination or, alternatively, none need be displayed if not appropriate. After completion of execution of step SC10, the guidance is continued for the prior guidance route (step SC24). Thereafter, the program returns to the main routine of FIG. 7.

The "guidance processing with a single route" of step SC24 refers to guidance information presentation for assisting the vehicle's travel along the guidance route. A guidance route is determined by search at step SA4 of FIG. 7 or at step SB18 of FIG. 8. This determined guidance route is displayed on display 33. The guidance route display is presented in such a way that an image of the vehicle is always centrally located on the screen. Also, certain information regarding one or more points along the guidance route where the vehicle is expected to change its travel direction may be issued when necessary. The process of presentation of a variety of information items at appropriate times thus enables the vehicle to travel successfully along the guidance route (step SC24).

Figure 10:
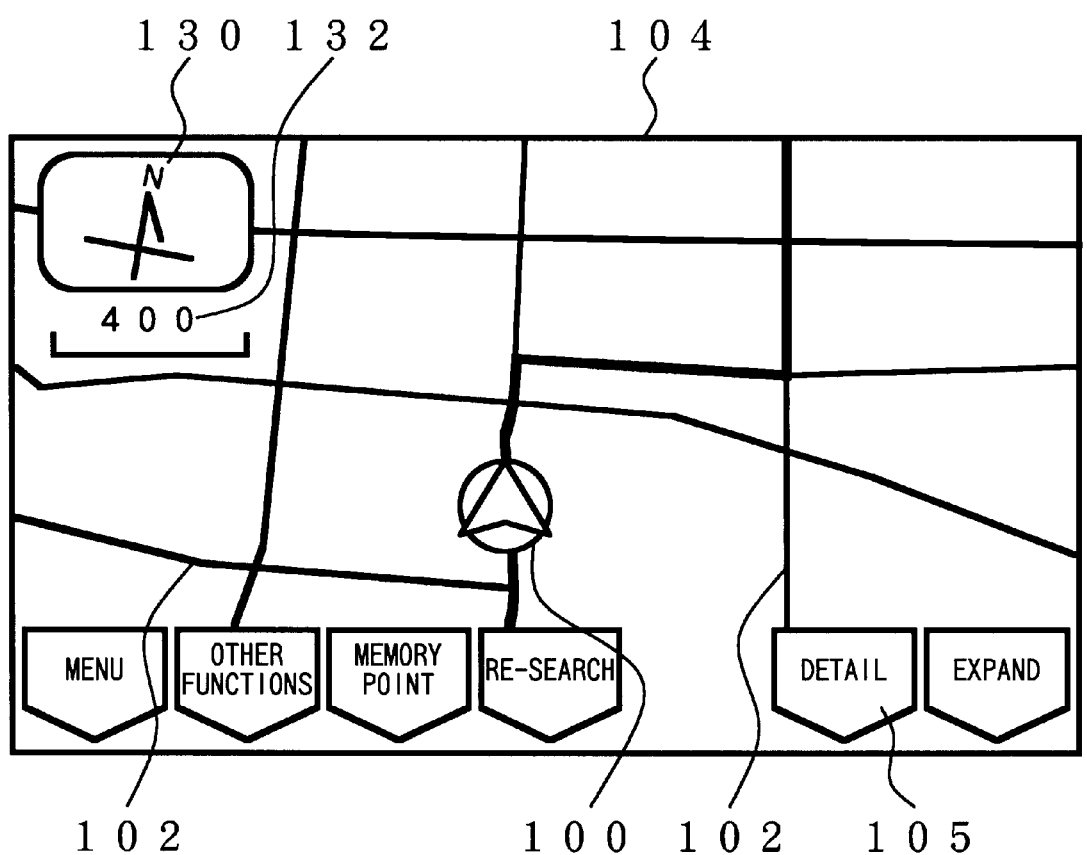
FIG. 10 shows a display 33 prior to a route re-search based on VICS data.

FIG. 10 is a diagram showing one example of an image on the display 33 immediately prior to receipt of VICS data VD, in other words, a guidance route determined by the route search processing of FIG. 7 (step SA4), and the present vehicle location are visually presented on display 33.

Reference numeral "100" designates the present location and travel direction of the vehicle. Displayed on screen 104 are only major trunk roads 102. Numeral 130 indicates the absolute North direction. A value 132 of this symbol 130 denotes a map reduction scale of the display on screen 104, more specifically, that the scale of reduction is 1/400 in FIG. 10. Some keys 105 are displayed at the lower part of screen, including "MENU," "OTHER FUNCTIONS," "MEMORY POINT," "RE-SEARCH," "DETAIL," "EXPAND," etc.

Figure 11:
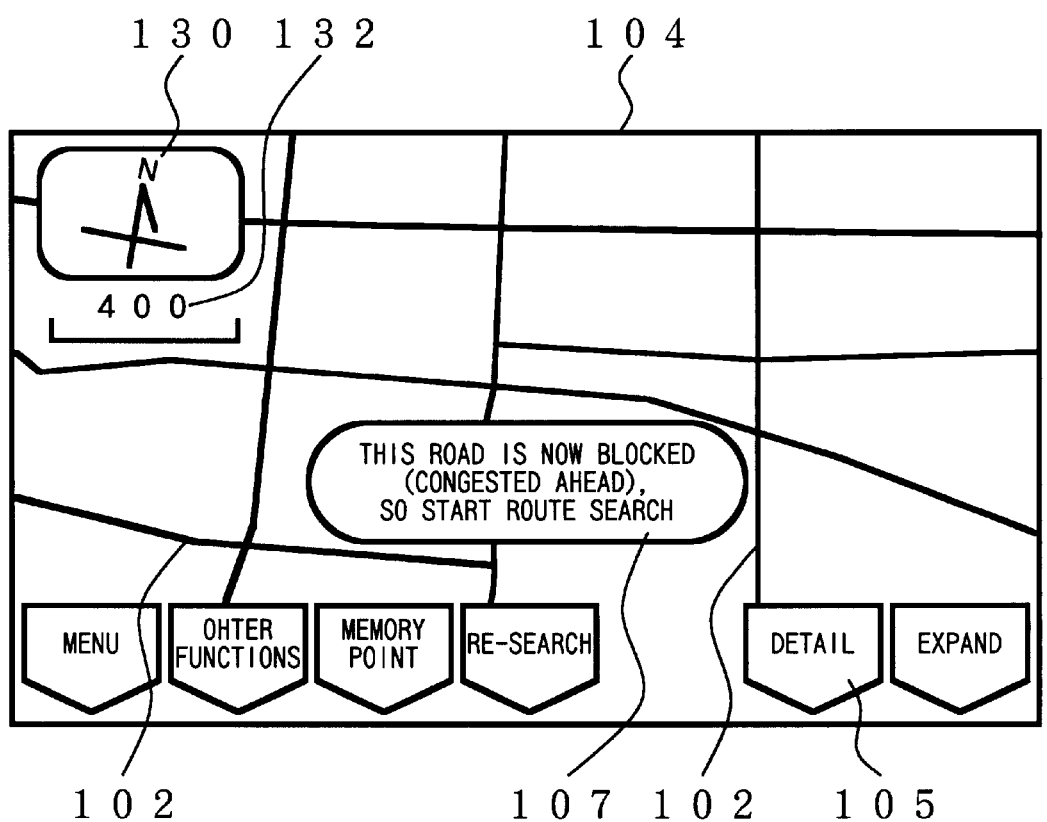
FIG. 11 shows a screen display immediately before execution of a route re-search based on VICS data.

FIG. 11 shows a display image just before execution of a route re-search by the dynamic route search subroutine upon receipt of VICS data. In other words, FIG. 11 shows one typical image as displayed when it is judged from the VICS data VD received during route guidance that a route re-search can be completed prior to arrival at the next branch point. A message 107 is centrally displayed on the screen, which message informs the operator of initiation of a route re-search by execution of the dynamic route search subroutine, the message reading "THIS ROAD IS NOW BLOCKED (CONGESTED AHEAD), SO START ROUTE SEARCH."

Figure 12:
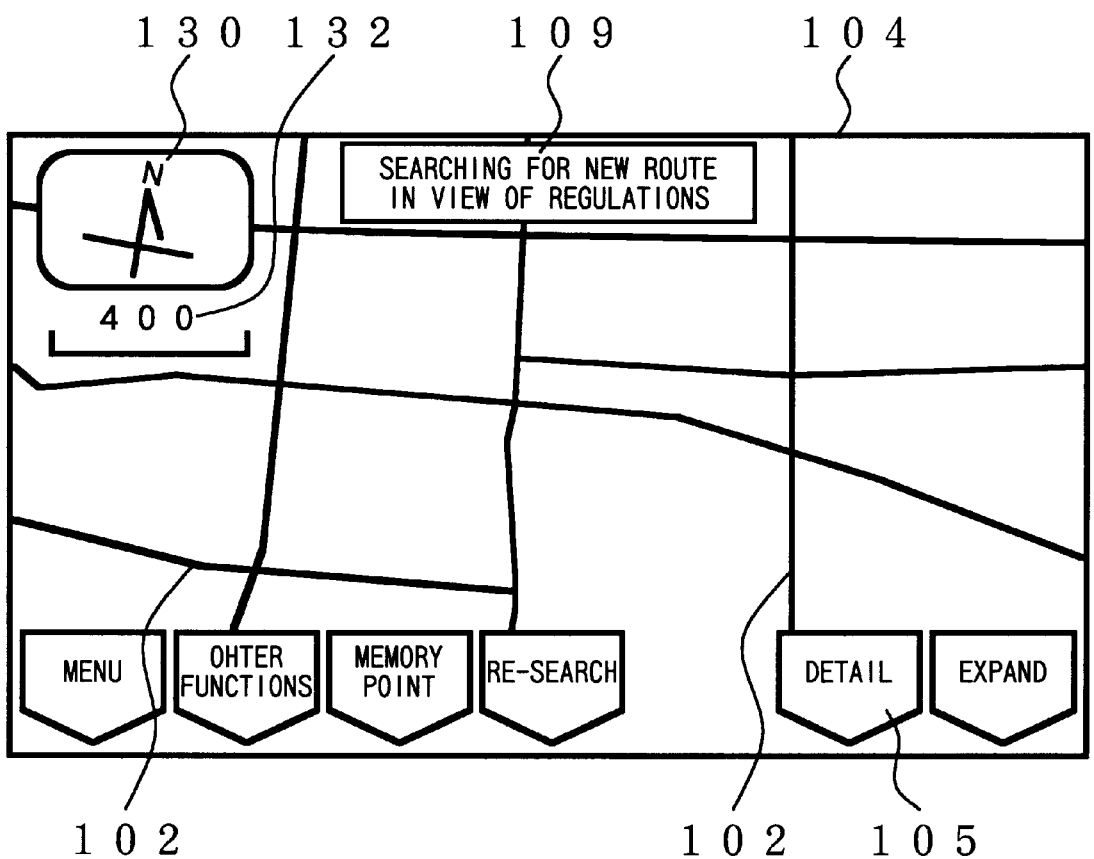
FIG. 12 shows a screen display as it appears while the route re-search is being performed based on VICS data.

FIG. 12 shows a display screen when a route re-search is actually effectuated as the dynamic route search. The message 109 "SEARCHING FOR NEW ROUTE IN VIEW OF REGULATIONS" is displayed at the upper part of the screen. Note that the route may be searched either with reference to the entire area between the present vehicle location and the destination or a partial route search covering only a portion of that area to determine a detour around the traffic problem.

Figure 13:
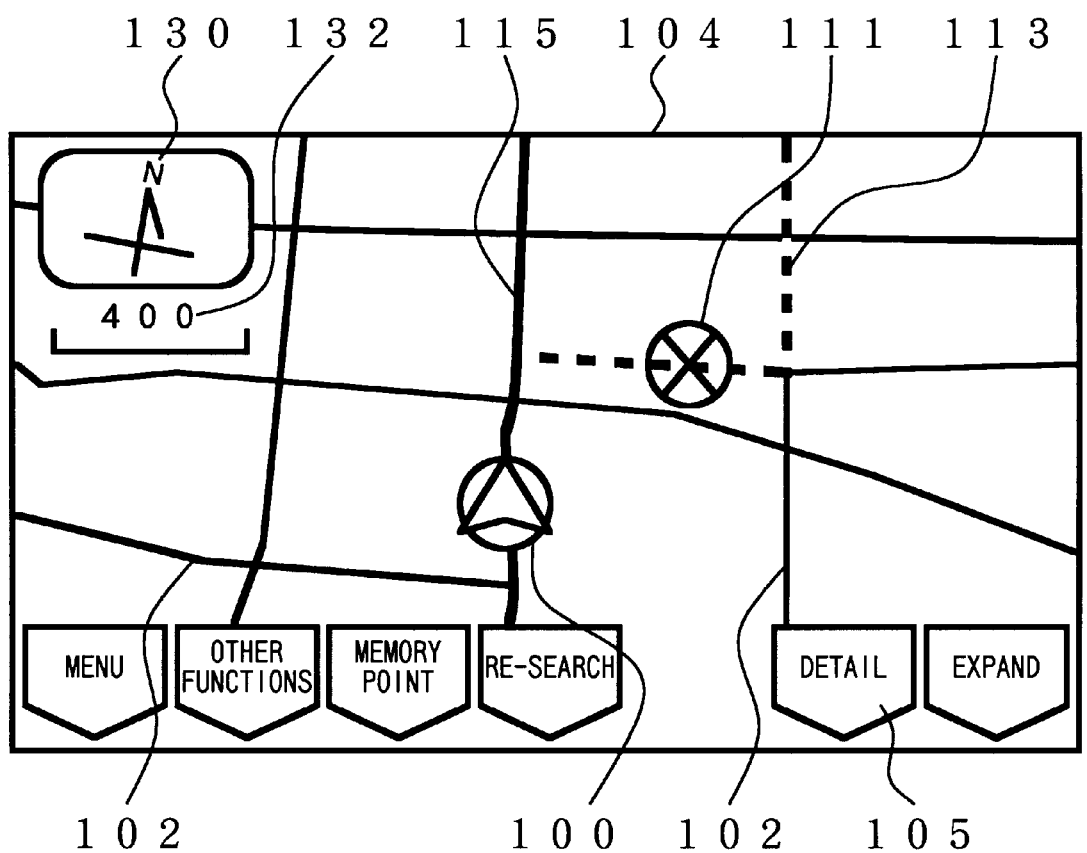
FIG. 13 shows a display screen in which a new route and an old route, as searched based on VICS data, are displayed in parallel.

FIG. 13 shows a subsequent display screen in which two routes are displayed in a parallel fashion on the display 33 after completion of the route re-search, i.e. step SC8 of FIG. 9. Displayed at the upper part of the screen are an old guidance route 113 and a symbol 111 indicative of one blocked portion of the route. Further, a new route 115 is simultaneously displayed. With this screen, when the guidance start key is depressed, the old guidance route 113 and symbol 111 are then erased. Additionally, while in FIG. 13 the old guidance route 113 is indicated by a broken line, display schemes with different colors may be employed to provide visual distinction between the old guidance route 113 and the new route 115.

As has been described in detail, the dynamic route search in accordance with the present invention employs a situation-dependent scheme for permitting selective execution of a route re-search based on VICS data received, depending upon whether or not sufficient time is available for executing the series of process steps involved in a route re-search. More specifically, even where VICS data is presently being received, if the vehicle has come so close to an intended target branch point that there is no time permitting a route change in accordance with a route re-search, then the VICS data received at that point in time is ignored.

The present invention is not limited to the foregoing embodiments and may be modified without departing from its basic concept. For example, instead of commands input by operation of the touch switch 34 or of a mouse cursor, commands may be input by the voice of the operator. If this is the case, the input/output device 30 is provided with an audio input device such as a microphone, and with an audio processor 11 having the capability to perform audio analysis.

Also, in the case of receiving VICS data by utilizing FM radio broadcasting, since traffic information is provided with respect to a number of roads throughout a wide area, it may be arranged so that this VICS data is utilized to an extent dependent upon a search cost for each road at the time of the route search (step SA4) of FIG. 7. In other words, the search cost of each road may increase or decrease with a change in degree of congestion GD. By way of example, if the congestion degree GD is significant, that is, when the road of interest is full of vehicles, the search cost is so defined as to render difficult selection of that road as part of the guidance route. In this manner, a search is conducted for a guidance route while excluding those roads high in congestion degree GD to the maximum extent feasible.

Further, as explained earlier, the road data file F4 may be configured with the VICS link numbers VRB identical to the road numbers DR of road data file F4, in which case the link data file F17 is not required.

In addition, while in the above-described embodiments the touch switch 34 was used for necessary key operations, these operations may alternatively be provided for by use of a plurality of physical push switches, similar to those provided just below the display 33. In this case, functions of the respective push switches will be displayed as icons in the lower part of the display screen.

Furthermore, in the 2-route parallel display of FIG. 13, certain route segments may be visually presented in such a way as to occupy the entire screen. In other words, the map's reduction scale may be suitably adjusted so that a detour route is completely contained within the display screen.

In addition, while in the described embodiments whether a route re-search based on VICS data is to be performed is judged depending upon the time required for the vehicle to arrive at the next branch point on the route under guidance, this judgement may optionally be carried out in the following manner. Assume that congestion or the like is detected ahead on the guidance route, and that there are no points where the vehicle is to change its travel direction between the present vehicle location and such a congested road segment. If this is the case, a detour route is to be searched. However, where the vehicle is at a location that is less in distance to a right/left-turning point as newly set by this detour route, then the re-searched detour route is cancelled or withdrawn from consideration, while causing guidance for the immediately prior guidance route to be continued. In other words, when the vehicle has already come so close to a course-change (right/left-turning) point where the vehicle is scheduled to change its travel direction to enter a newly determined detour route that a successful turn to the right or left can no longer be expected, then such guidance for the new detour path is interrupted or disabled. Note in this case that an indication (step SC10 of FIG. 9) may be provided to inform the operator of the presence of a congested road ahead on the guidance route.

The start-up condition for the route re-search processing based on VICS data may be modified in the manner which follows. Assume that the guidance route is a straight path and assume also that a congested portion is indicated by VICS data for a portion of the guidance route yet to be travelled. In this case, use of one branch point (such as an intersection or the like) which lies between the present vehicle location and the congestion and is also is nearest to the latter is used as a reference point. In other words, the time required for the vehicle to move from its present location to such a specified branch point nearest to the congestion is compared with the time required for completion of a route re-search and the like. In short, whether or not a route re-search should be executed is judged depending upon whether sufficient time is available for the re-search before the vehicle arrives at a branch point where a turn might be required in accordance with the route re-search.

Further, a route search may utilize road information received from the road information station such as VICS at the instant when it is initiated responsive to setting of the destination or the like. In other words, in a search for a route from a starting location to a destination, at the time of starting navigation the search cost may be weighed based on the most recently received road information. Thereby, the risk of unintentionally selecting roads with traffic difficulties as part of the guidance route may be eliminated prior to departure.

While the previous embodiments have been described as including a route search utilizing all the VICS data received, this may be modified as follows. The search area may be limited to that which contains those roads usable in the search for the guidance route. By way of example, the route search may be limited to only certain roads within areas nearby the starting location and the destination, in addition to an area covering a region limited to a specified distance from a straight line extending between the starting location and the destination. Hence, with regard to the received VICS data also, any information as to roads outside of the area subject to a route search may be either cancelled or not used.

For example, assume that the received VICS data provides information about respective roads as shown in FIG. 6. In this case, if the road number DR104 corresponds to a road out of the search area, information concerning this road number DR104 is then cancelled or simply not used. Thus, cut-and-try selectivity is available also for the road information received as VICS data or the like, which selectivity reduces route-search time.

The present invention is not limited to the previously described embodiments and may be changed without departing from the concept of the invention. For example, the recording medium for storage of various kinds of data items shown in FIG. 2 may be replaced with other writable recording media, such as a floppy diskette. Further, the navigation apparatus may include an audio input device with an analog/digital converter. This audio input device may be configured to execute respective operations responsive to audio/voice commands as input through this audio input device.

Furthermore, in the navigation apparatus in accordance with the present invention, all or several of the subroutine discussed supra may be executed at the information management center(s) such as VICS, ATIS, and the like. This processed information would then be received by the data transceiver 27. For example, the destination setting (step SA3) and the route search (step SA4) of FIG. 5 may be remotely executed at the information processing center utilizing map information stored there. Guidance route data determined by search at that remote location would then be transferred via the data transceiver 27 of the navigation apparatus of this invention and would be processed in the navigation apparatus of the present invention to produce a guidance display. In other words, certain criteria for a route to a destination and/or one or more stop-over facilities may be transmitted from the navigation apparatus of this invention to the information management center. The information management center, responsive to receipt of such criteria, would perform a search for both a desired facility and a route leading to the destination. Then, the search results would be transmitted from the information management center to the navigation apparatus along with map information associated therewith.

The facility identified by the search is visually indicated on display 33, based on the search results as received. With such an arrangement, it becomes possible to retrieve, extract and search for each facility based on detailed and updated information for respective facilities in the immediate area around the present vehicle location. It is also possible in a search for a facility to account for recent changes such as newly established one-way roads. In this case, it is required that the information on the respective facilities, as stored in the information management center, be regularly updated.

Furthermore, the information storage device 37 which stores therein the respective programs of this invention previously described and information such as maps and display symbols, as well as equivalents thereto, may be so designed as to enable commercially available computer equipment to make use of the same. In other words, the programs stored in the information storage device 37 are capable of being executed by ordinary computers. If this information storage device 37 is connected to a handheld portable computer along with a device capable of detecting present vehicle location in cooperation with GPS receiver 25, it becomes possible for the computer to execute the intended navigation routines. Furthermore, the present invention may also be used as navigation apparatus for land vehicles other than motorcars, i.e. ships, aircraft, helicopters and other vehicles, and the maps used for navigation may alternatively be nautical charts or submarine/sea-bed maps. The present invention may also be applied to handheld or portable navigation apparatus instead of navigation apparatus built into a vehicle. This invention is applicable also to small-size portable, hand-held navigation apparatus, such as used in cycling, traveling, mountain-climbing, hiking, fishing, etc.

Embodiments of the present invention may further include the following:

(1) A subroutine for judging whether the present location is off the guidance route and, if off the guidance route, is at a location suitable for returning to the guidance route, and initiating a guidance route re-search depending on this judgment.

(2) A subroutine for detection of a present location by generation of a plurality of candidates on the assumption that the present location corresponds to a point identified by map information. The subroutine would then select from among these plural generated present-location candidates that specific one location with maximum possibility of being the actual present location, determine whether it is necessary to switch between candidates subject to this selection, and temporarily prevent conduct of a search for a guidance route for a predefined time period, in conformity with the results of this judgment.

(3) Matching point detection means for detecting, in accordance with certain matching criteria or conditions, whether there is either a facility or a facility-associated road which matches the detected present position, and means for preventing further re-search for a route upon detection of such a matched facility or facility-associated road by said matching point detection means.

(4) Travel path storage means for detecting a road that matches the present location of the vehicle in accordance with certain matching criteria and for storing information concerning this road, and permission means for permitting execution of a guidance route re-search only when the road matching the present location of the vehicle is successively identical (more than one match) to a road corresponding to the travel path as stored in said travel path storage means.

(5) Matching point detection means for detecting, in accordance with certain matching criteria, whether there is either a facility or a facility-associated road which matches the detected present position of the vehicle, travel path storage means for detecting a road matching the present location of the vehicle in accordance with certain matching criteria and for storing information concerning the matching road, and permission means for preventing a route re-search upon detection of any matching facility or facility-associated road and for permitting execution of a re-search for a guidance route only when the road matched with the present location of the vehicle is successively identical (more than one match) to a road corresponding to the travel path as stored in said travel path storage means.

(6) In combination with (3), (4) or (5) above, calculation means for calculating a correlation value, as a matching criterion, for the vehicle's present location and a point on each road, and for taking the maximum correlation value as the matching road and/or facility within a geographical range including the detected present location.

(7) In combination with (6), a historical average vehicle speed or travel time may be added to the certain matching criteria.

(8) The present invention may be embodied a medium containing stored therein a computer program for navigation including the steps of detecting a geographical present location of a vehicle, detecting in accordance with certain matching criteria whether a facility or facility associated road is present which matches the present location, and preventing a route re-search when a matched facility or facility-associated road is found to exist. This medium may also store information for matching road travel paths and allow for a re-search of a guidance route only when a road matching the present location is found to be identical to the stored travel path more than once. The matching criteria may be calculated for values for correlation between the detected present location and a point on each road. The point with maximum correlation value would be utilized as the matching road and/or a facility within a facility geographical range including the detected present location. A historical average vehicle speed or straight-travel time may be added to the matching criteria.

As has been described in detail previously, the present invention provides for selective designation of whether or not a route search, responsive to detection of a traffic problem based on VICS data received during travel along a previously determined guidance route, is to be limited to modification of that guidance route by detour around that traffic problem. More specifically, a route change is to be executed only when sufficient time is available for completion of execution of a series of procedures associated with the route re-search, before the vehicle arrives at a point on the guidance route where guidance in the nature of preparation for a turn is to begin. Accordingly, it becomes possible to eliminate need for a sudden change in travel direction due to a route change. This makes it possible to prevent communication of complicated or misleading information as guidance information, as might otherwise occur due to a rapid or sudden change in travel direction.

The entire disclosure of Japanese Patent Application No. 9-105236 filed on Apr. 8, 1997, including specification, claims and drawing, is incorporated herein by reference.

What is claimed is:

1. A route search apparatus comprising:

search means for searching a database to determine a guidance route;

a receiver for receiving information as to an impedance to travel on a road within a local area;

present location detection means for detecting the present location of the apparatus;

first comparison means for comparing the received information, inclusive of location of an impedance to travel, with said guidance route to determine if the impedence to travel is located ahead on the guidance route;

search estimation means, responsive to a determination that the location of the impedence to travel is located ahead on the guidance route, for determining a necessary time or distance required for a new route search to determine a new guidance route by-passing the impedence to travel and for preparation to initiate guidance based on the new guidance route;

prediction means for determining a predicted travel time or predicted travel distance between the detected present location and a specified location in advance of the impedance to travel;

second comparison means for comparing the necessary time with the predicted travel time or the necessary distance with the predicted travel distance; and judgement means for deciding, based on the comparison by said second comparison means, whether or not the new route search is to be conducted.

2. The route search apparatus according to claim 1 further comprising override means for determining whether or not the impedence to travel is an impasse and for commanding the new route search if determined to be an impasse, thus overriding any decision by said judgement means that a new route search is not to be conducted.

3. A navigation apparatus for a vehicle comprising:

present position detection means for detecting present position of the vehicle;

a receiver for receiving road traffic information;

route search means for searching a database to determine a route leading to a destination;

necessary time calculation means for calculating time required for a new route search performed in accordance with the road traffic information received by said road traffic information reception means to determine a new guidance route and for preparation to initiate guidance for the new guidance route;

predictive time calculation means for calculating a predicted time required for the vehicle to arrive at a specified location in advance of a road branch in the direction of forward travel by the vehicle;

comparison means for comparing said necessary time with said predicted time; and judgment means, responsive to said comparison, for judging whether or not the new route search is to be conducted.

4. The navigation apparatus according to claim 3 further comprising means for determining if the received road traffic information includes location of an impedence to travel, for determining if the location of an impedence to travel lies ahead and on the guidance route and for commanding the new route search responsive to a determination that an impedence to travel is located ahead on the guidance route.

5. The navigation apparatus according to claim 3 wherein said specified location is a location wherein a change of course is to be made to start travel of the new guidance route.

6. A medium storing therein a computer program for navigation of a vehicle, the program including:

calculating a necessary time for execution of a route search, in accordance with updated road traffic information received from a source remote from the vehicle, to determine a new guidance route and for preparation to initiate guidance along the new guidance route;

calculating a predicted time when the vehicle is expected to reach a travel direction change point leading to the new guidance route;

comparing the predicted time with the necessary time; and executing the route search in accordance with results of the comparison.

7. The medium according to claim 6 wherein the program further comprises determining whether or not said road traffic information includes information as to an impedence to travel and whether or not the impedence to travel is located ahead and on a guidance route presently travelled and initiating the new route search responsive to a determination of an impedence to travel ahead on the presently travelled guidance route.

8. A navigation apparatus for a vehicle comprising:

present position detection means for detecting the present location of the vehicle;

a receiver for receiving road traffic information;

route search means for searching to determine a guidance route leading to a destination;

necessary time calculation means for calculating time required for a new route search, performed in response to receipt of the road traffic information, for determination of a new guidance route and for preparation to initiate guidance for the new guidance route;

predictive time calculation means for calculating a predicted time required for the vehicle to reach a travel direction-change location in the forward direction at which the vehicle must to turn to follow the new guidance route;

comparison means for comparing said necessary time with said predicted time; and judgment means responsive to said comparison, for judging whether or not the new route search is to be conducted.

9. The navigation apparatus according to claim 8 further comprising means for determining if the received road traffic information includes location of an impedence to travel, for determining if the location of an impedence to travel lies ahead and on the guidance route and for commanding the new route search responsive to a determination that an impedence to travel is located ahead on the guidance route.

10. The navigation apparatus according to claim 8 wherein said travel direction-change location is the starting point for the new guidance route.

11. A medium storing therein a computer program for navigation processing for use in a vehicle, the program comprising:

calculating a necessary time for a new route search for a new guidance route in accordance with road traffic information received by communication from a location remote from the vehicle and for preparation for start of guidance for the new guidance route;

calculating a predicted time when the vehicle is expected to reach a certain location in advance of a road branch;

comparing the predicted time with the necessary time for a determination of whether or not the new route search should be conducted.

12. The medium according to claim 11 wherein the program further comprises determining whether or not said road traffic information includes information as to an impedence to travel and whether or not the impedence to travel is located ahead and on a guidance route presently travelled and initiating the new route search responsive to a determination of an impedence to travel ahead on the presently travelled guidance route.

13. The medium according to claim 11 wherein said certain location is the location where a guidance information message is scheduled to start.

14. The medium according to claim 11 wherein said road branch is an intersection where the vehicle is to turn in accordance with the new guidance route.

* * * * *